US012368224B2

(12) United States Patent
Seki et al.

(10) Patent No.: US 12,368,224 B2
(45) Date of Patent: *Jul. 22, 2025

(54) DIRECTIONAL COUPLER

(71) Applicant: Murata Manufacturing Co., Ltd., Kyoto (JP)

(72) Inventors: Kenta Seki, Kyoto (JP); Yasushi Shigeno, Kyoto (JP); Daisuke Tokuda, Kyoto (JP); Ryangsu Kim, Kyoto (JP); Katsuya Shimizu, Kyoto (JP); Kazuhito Osawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 381 days.

This patent is subject to a terminal disclaimer.

(21) Appl. No.: 17/821,492

(22) Filed: Aug. 23, 2022

(65) Prior Publication Data

US 2022/0407211 A1 Dec. 22, 2022

Related U.S. Application Data

(63) Continuation of application No. 16/941,862, filed on Jul. 29, 2020, now Pat. No. 11,456,517.

(30) Foreign Application Priority Data

Aug. 1, 2019 (JP) ................................ 2019-142227

(51) Int. Cl.
*H01P 5/18* (2006.01)

(52) U.S. Cl.
CPC .................................... *H01P 5/18* (2013.01)

(58) Field of Classification Search
CPC ................................................ H01P 5/18–188
See application file for complete search history.

(56) References Cited

U.S. PATENT DOCUMENTS 5,128,639 A 7/1992 Ueda et al.
8,249,544 B2 * 8/2012 Okabe .................... H01P 5/184 455/292
8,289,102 B2 10/2012 Yamamoto et al.
9,614,269 B2 4/2017 Srirattana et al.
(Continued)

FOREIGN PATENT DOCUMENTS

CN 107210507 A 9/2017
JP H05-41206 U 6/1993
(Continued)

OTHER PUBLICATIONS

Notice of Reasons for Rejection for Japanese Patent Application No. 2019-142227 dated Apr. 5, 2022.

*Primary Examiner* — Andrea Lindgren Baltzell
*Assistant Examiner* — Alan Wong
(74) *Attorney, Agent, or Firm* — McDonald Hopkins LLC

(57) ABSTRACT

A directional coupler includes a main line, a first sub-line to be electromagnetically coupled to the main line, a second sub-line to be electromagnetically coupled to the main line, and a coupling terminal configured to output a detection signal corresponding to a radio frequency signal that is transmitted through the main line, the first sub-line and the second sub-line are different in length from each other, and connection between the first sub-line and the coupling terminal and connection between the second sub-line and the coupling terminal are switched.

7 Claims, 16 Drawing Sheets

(56) References Cited

U.S. PATENT DOCUMENTS

| | | | |
|---|---|---|---|
| 9,866,244 B2 | 1/2018 | Srirattana et al. | |
| 10,263,315 B2 | 4/2019 | Okamoto | |
| 10,498,004 B1 | 12/2019 | Ji et al. | |
| 10,742,189 B2 * | 8/2020 | Srirattana | H03G 3/3042 |
| 10,778,175 B2 * | 9/2020 | Lim | H03F 3/213 |
| 11,121,444 B2 | 9/2021 | Seki et al. | |
| 11,456,517 B2 * | 9/2022 | Seki | H01P 5/18 |
| 11,509,034 B2 * | 11/2022 | Seki | H04B 1/04 |
| 2016/0172737 A1 | 6/2016 | Srirattana et al. | |
| 2018/0351530 A1 | 12/2018 | Srirattana et al. | |

FOREIGN PATENT DOCUMENTS

| | | | |
|---|---|---|---|
| JP | H108-116203 | A | 5/1996 |
| JP | 2009027617 | A | 2/2009 |
| JP | 2014239550 | A | 12/2014 |
| WO | 2017013927 | A1 | 1/2017 |
| WO | 2019151446 | A1 | 8/2019 |

* cited by examiner

DIRECTIONAL COUPLER

This application is a continuation of U.S. patent application Ser. No. 16/941,862 filed on Jul. 29, 2020, which claims priority from Japanese Patent Application No. 2019-142227 filed on Aug. 1, 2019. The contents of these application are incorporated herein by reference in their entireties.

BACKGROUND OF THE DISCLOSURE

1. Field of the Disclosure

The present disclosure relates to a directional coupler.

2. Description of the Related Art

For example, Japanese Unexamined Patent Application Publication No. 2009-27617 discloses a directional coupler including a main line that propagates a radio frequency from an input terminal toward an output terminal, and a sub-line that is electromagnetically coupled to the main line. A detection terminal is connected to one end of the sub-line, and a termination resistor is connected to the other end of the sub-line.

However, when the above-described directional coupler of the related art is adjusted to have a desired degree of coupling in a low frequency band, the directional coupler has equal to or more than the desired degree of coupling in a high frequency band, and an insertion loss of the main line is unnecessarily increased. On the other hand, when the directional coupler is adjusted to have the desired degree of coupling in the high frequency band, the degree of coupling is insufficient in the low frequency band. That is, in the directional coupler of the related art, there is a problem that a stable degree of coupling and insertion loss cannot be secured over a predetermined frequency band including a low frequency band and a high frequency band.

BRIEF SUMMARY OF THE DISCLOSURE

The present disclosure has been made in order to solve the above-described problem, and an object thereof is to provide a directional coupler having a stable degree of coupling and insertion loss over a predetermined frequency band.

In order to achieve the above-described object, a directional coupler according to an aspect of the present disclosure includes a main line, a first sub-line to be electromagnetically coupled to the main line, a second sub-line to be electromagnetically coupled to the main line, and a coupling terminal configured to output a detection signal corresponding to a radio frequency signal that is transmitted through the main line, the first sub-line and the second sub-line are different from each other in length, and connection between the first sub-line and the coupling terminal, and connection between the second sub-line and the coupling terminal are switched.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Figure 1:
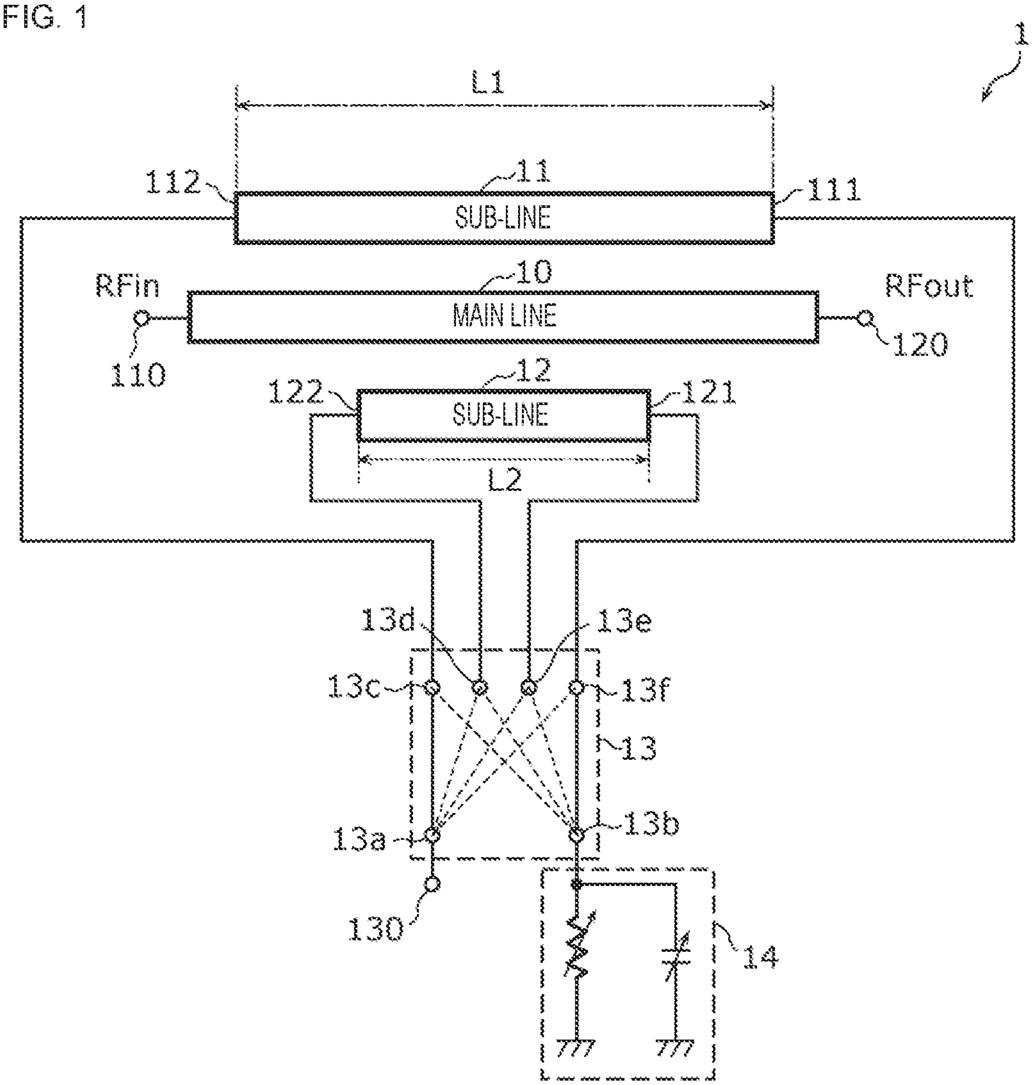
FIG. 1 is a circuit diagram illustrating an example of a functional configuration of a directional coupler according to an embodiment.

Hereinafter, an embodiment of the present disclosure and modifications thereof will be described in detail with reference to the drawings. It should be noted that the embodiment and the modifications thereof to be described below are all inclusive or specific examples. The numerical values, shapes, materials, constituent elements, arrangement and connection forms of the constituent elements, and the like shown in the following embodiment and modifications are mere examples, and are not intended to be limited to the present disclosure. Among the constituent elements in the following embodiment and modifications thereof, the constituent elements that are not recited in the independent claim are described as arbitrary constituent elements. In addition, the sizes of the constituent elements illustrated in the drawings or the ratios of the sizes thereof are not necessarily strict.

Embodiment

1. Circuit Configuration of Directional Coupler 1

FIG. 1 is a circuit diagram illustrating an example of a functional configuration of a directional coupler 1 according to an embodiment. As illustrated in the same figure, the directional coupler 1 includes a main line 10, sub-lines 11 and 12, a coupling terminal 130, a switch circuit 13, and a termination circuit 14. The main line 10 and the sub-line 11 are electromagnetically coupled to each other, and the main line 10 and the sub-line 12 are electromagnetically coupled to each other.

One end and the other end of the main line 10 are connected to an input port 110 (RFin) and an output port 120 (RFout), respectively.

The sub-line 11 is an example of a first sub-line, and has one end 111 and the other end 112. The sub-line 12 is an example of a second sub-line, and has one end 121 and the other end 122. The one end 111 of the sub-line 11 and the one end 121 of the sub-line 12 are respectively examples of first end, and the other end 112 of the sub-line 11 and the other end 122 of the sub-line 12 are respectively examples of second end. The sub-line 11 and the sub-line 12 are different in length from each other. The definition of the lengths of the sub-lines 11 and 12 will be described later.

The coupling terminal 130 is a terminal that outputs a detection signal corresponding to a radio frequency signal that is transmitted through the main line 10. Specifically, the coupling terminal 130 outputs, as a detection signal, a signal that is transmitted through one of the sub-lines 11 and 12 that are electromagnetically coupled to the main line 10.

The termination circuit 14 is a circuit that is connected to the sub-line 11 or 12 via the switch circuit 13, and terminates the sub-line 11 or 12. Note that the termination circuit 14 may be a termination circuit in which a termination impedance is variable.

The switch circuit 13 is an example of a first switch circuit and an example of a second switch circuit, and includes terminals 13*a*, 13*b*, 13*c*, 13*d*, 13*e*, and 13*f*. The terminal 13*a* is connected to the coupling terminal 130, the terminal 13*b* is connected to the termination circuit 14, the terminal 13*c* is connected to the other end 112, the terminal 13*d* is connected to the other end 122, the terminal 13*e* is connected to the one end 121, and the terminal 13*f* is connected to the one end 111. Additionally, the terminal 13*a* can be connected to any one of the terminals 13*c* to 13*f*, and the terminal 13*b* can be connected to any one of the terminals 13*c* to 13*f*. Conversely, the terminal 13*c* can be connected to the terminal 13*a* or 13*b*, the terminal 13*d* can be connected to the terminal 13*a* or 13*b*, the terminal 13*e* can be connected to the terminal 13*a* or 13*b*, and the terminal 13*f* can be connected to the terminal 13*a* or 13*b*.

For example, the terminal 13*a* and the terminal 13*c* are connected to each other, and the terminal 13*b* and the terminal 13*f* are connected to each other, whereby the other end 112 of the sub-line 11 is connected to the coupling terminal 130, and the one end 111 of the sub-line 11 is connected to the termination circuit 14. In addition, when the terminal 13*a* and the terminal 13*f* are connected to each other and the terminal 13*b* and the terminal 13*c* are connected to each other, the one end 111 of the sub-line 11 is connected to the coupling terminal 130, and the other end 112 of the sub-line 11 is connected to the termination circuit 14. That is, the switch circuit 13 switches connection between the one end 111 and the other end 112 of the sub-line 11 and the coupling terminal 130 and the termination circuit 14. Therefore, in response to a switching operation of the switch circuit 13, the directional coupler 1 can output, from the coupling terminal 130, any one of a signal that is transmitted through the main line 10 from the input port 110 toward the output port 120 (traveling wave) and a signal that is transmitted through the main line 10 from the output port 120 toward the input port 110 (reflected wave) as a detection signal. In addition, at this time, the terminals 13*d* and 13*e* are not connected to any terminals, and thus the sub-line 11 of the sub-line 11 and the sub-line 12 is connected to the coupling terminal 130.

Further, for example, the terminal 13*a* and the terminal 13*d* are connected to each other, and the terminal 13*b* and the terminal 13*e* are connected to each other, whereby the other end 122 of the sub-line 12 is connected to the coupling terminal 130, and the one end 121 of the sub-line 12 is connected to the termination circuit 14. Further, the terminal 13*a* and the terminal 13*e* are connected to each other and the terminal 13*b* and the terminal 13*d* are connected to each other, whereby the one end 121 of the sub-line 12 is connected to the coupling terminal 130, and the other end 122 of the sub-line 12 is connected to the termination circuit 14. That is, the switch circuit 13 switches connection between the one end 121 and the other end 122 of the sub-line 12 and the coupling terminal 130 and the termination circuit 14. In addition, at this time, the terminals 13*c* and 13*f* are not connected to any terminals, and thus the sub-line 12 of the sub-line 11 and the sub-line 12 is connected to the coupling terminal 130.

According to the above-described connection configuration, the switch circuit 13 functions as the first switch circuit that selects the sub-line to be connected to the coupling terminal 130. In other words, a connection of the coupling terminal 130 is configured to be switched by the switch circuit 13 between the sub-line 11 and the sub-line 12. Further, the switch circuit 13 also functions as the second switch circuit that switches the directionality of at least one of the sub-lines 11 and 12 (which one of the traveling wave and the reflected wave is to be outputted). Specifically, for example, the switch circuit 13 is configured to selectively switch between a first connection state, in which the one end 111 of the sub-line 11 or the one end 121 of the second sub line 12 is connected to the coupling terminal 130, and the other end 112 of the sub-line 11 or the other end 122 of the sub-line 12 is connected to the termination circuit 14, and a second connection state, in which the one end 111 of the sub-line 11 or the one end 121 of the sub-line 12 is connected to the termination circuit 14, and the other end 112 of the sub-line 11 or the other end 122 of the sub-line 12 is connected to the coupling terminal 130.

Note that, in the directional coupler 1 according to the present embodiment, the sub-line 11 and the sub-line 12 are arranged with the main line 10 interposed therebetween. According to this, it is possible to secure a distance between the sub-line 11 and the sub-line 12, and thus it is possible to improve isolation between the sub-line 11 and the sub-line 12.

Here, a length of a sub-line will be defined. The length of the sub-line refers to a length of a wiring conductor extending from one end of the sub line to the other end of the sub line, which will be defined below.

The sub-line is defined as a wiring conductor provided along a main line and arranged in a first section in which a first distance from the wiring conductor to the main line is substantially constant. In this case, the wiring conductor in a second section positioned on each side of the first section has a second distance that is a distance from the main line larger than the first distance, and the one end and the other end of the sub-line are points at which the distance to the main line of the wiring conductor changes from the first distance to the second distance.

Alternatively, the sub-line is defined as a wiring conductor provided along the main line and arranged in a first section having a first width whose wiring width is substantially constant. In this case, a wire width of the wire conductor in a second section positioned on each side of the first section is a second width different from the first width, and the one end and the other end of the sub-line are points where the wire width of the wire conductor changes from the first width to the second width.

Alternatively, the sub-line is defined as a wiring conductor provided along the main line and arranged in a first section having a first film thickness whose thickness is substantially constant. In this case, a film thickness of the wiring conductor in a second section positioned on each side of the first section is a second film thickness different from the first film thickness, and the one end and the other end of the sub-line are points where the film thickness of the wiring conductor changes from the first film thickness to the second film thickness.

Alternatively, the sub-line is defined as a wiring conductor provided along the main line and arranged in a first section having a first degree of coupling in which a degree of coupling to the main line is substantially constant. In this case, a degree of coupling of the wiring conductor to the main line in a second section positioned on each side of the first section is a second degree of coupling smaller than the first degree of coupling, and the one end and the other end of the sub-line are points where the degree of coupling of the wiring conductor changes from the first degree of coupling to the second degree of coupling.

2. Frequency Characteristics of Directional Coupler 1

Figure 2B:
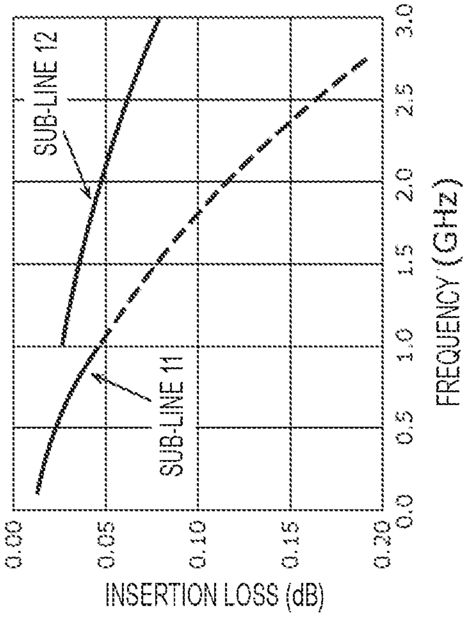
FIG. 2A and FIG. 2B are graphs illustrating frequency characteristics of degrees of coupling and insertion losses of the directional coupler according to the embodiment.
Figure 2A:
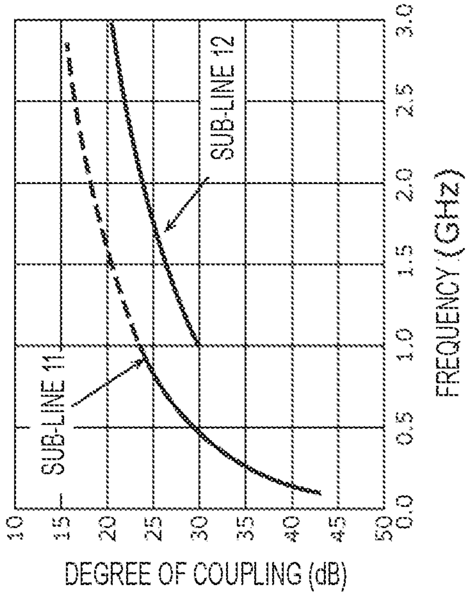

FIG. 2A and FIG. 2B are graphs illustrating frequency characteristics of degrees of coupling and insertion losses of the directional coupler 1 according to the embodiment. FIG. 2A illustrates frequency characteristics of degrees of coupling of the sub-lines 11 and 12, and FIG. 2B illustrates frequency characteristics of insertion losses of the main line 10 when the sub-line 11 or 12 is selected.

As illustrated in FIG. 2A, when the sub-line 12 is selected, a degree of coupling of about 24 dB is obtained around 2 GHz. On the other hand, when the sub-line 11 is selected, a degree of coupling of about 24 dB is obtained around 900 MHz.

Moreover, as illustrated in FIG. 2B, when the sub-line 11 is selected, an insertion loss around 2 GHz of the main line 10 is about 0.12 dB, but when the sub-line 12 is selected, an insertion loss around 2 GHz of the main line 10 can be reduced to about 0.05 dB. In addition, when the sub-line 11 is selected, an insertion loss around 900 MHz of the main line 10 is about 0.04 dB.

As illustrated in FIG. 2A and FIG. 2B, lengths of the sub-lines 11 and 12 are different from each other, and thus frequency dependencies of the degrees of coupling of the sub-lines 11 and 12 are different from each other. Further, the selection of the sub-lines 11 and 12 causes the frequency characteristics of the insertion loss of the main line 10 to be different.

By using the frequency characteristics, for example, in a band on a lower frequency side than 1.0 GHz (a frequency band lower than 1.0 GHz), in the switch circuit 13, the terminal 13*a* and the terminal 13*c* are connected to each other, and the terminal 13*b* and the terminal 13*f* are connected to each other, whereby the sub-line 11 and the coupling terminal 130 are connected to each other. In addition, in a band on a higher frequency side than 1.0 GHz (a frequency band equal to or higher than 1.0 GHz), in the switch circuit 13, the terminal 13*a* and the terminal 13*d* are connected to each other, and the terminal 13*b* and the terminal 13*e* are connected to each other, whereby the sub-line 12 and the coupling terminal 130 are connected to each other.

According to this, by selecting the sub-line 12 in a band on the high frequency side of the sub-lines 11 and 12, it is possible to suppress an unnecessarily large degree of coupling, and thus it is possible to reduce the insertion loss of the main line 10. Further, by selecting the sub-line 11 in a band on the low frequency side, it is possible to keep the insertion loss of the main line 10 low while suppressing a decrease in degree of coupling. That is, in a desired frequency band, a desired degree of coupling can be achieved without unnecessarily increasing the insertion loss of the main line 10.

Further, since the sub-line that is not selected is not connected to the coupling terminal 130 and the termination circuit 14 according to a connection form of the switch circuit 13, it is possible to suppress an increase in insertion loss. In particular, by opening a switch to disconnect the sub-line that is not selected, it is possible to minimize the increase in insertion loss.

Therefore, it is possible to provide the directional coupler 1 having a stable degree of coupling and an insertion loss over a predetermined frequency band including a band on a low frequency side and a band on a high frequency side.

3. Circuit Configuration of Directional Coupler 1A

Figure 3:
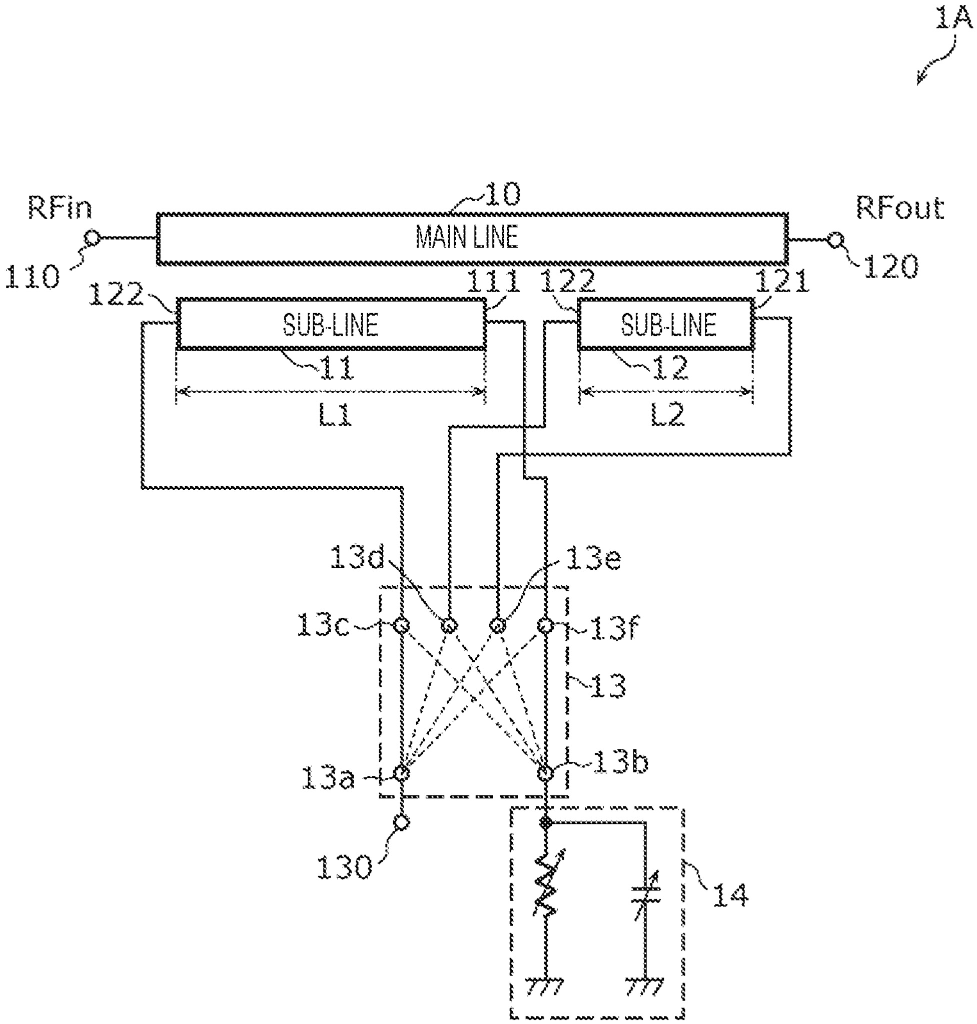
FIG. 3 is a circuit diagram illustrating an example of a functional configuration of a directional coupler according to Modification 1.

FIG. 3 is a circuit diagram illustrating an example of a functional configuration of a directional coupler 1A according to Modification 1. As illustrated in the same figure, the directional coupler 1A includes the main line 10, the sub-lines 11 and 12, the coupling terminal 130, the switch circuit 13, and the termination circuit 14. The main line 10 and the sub-line 11 are electromagnetically coupled to each other, and the main line 10 and the sub-line 12 are electromagnetically coupled to each other. The directional coupler 1A according to the present modification differs from the directional coupler 1 according to the embodiment only in an arrangement relationship of the sub-lines 11 and 12. Hereinafter, concerning the directional coupler 1A according to the present modification, description of the same configuration as that of the directional coupler 1 according to the embodiment will be omitted, and description will be focused on a configuration different from that of the directional coupler 1 according to the embodiment.

The sub-line 11 and the sub-line 12 are arranged on the same side with respect to the main line 10. According to this configuration, a wiring from the sub-line 11 to the coupling terminal 130 and a wiring from the sub-line 12 to the coupling terminal 130 can be arranged on the same side with respect to the main line 10, and therefore, wiring lengths can be shortened.

Thus, it is possible to provide the small directional coupler 1A having a stable degree of coupling and an insertion loss over a predetermined frequency band including a band on a low frequency side and a band on a high frequency side.

4. Circuit Configuration of Directional Coupler 1B

Figure 4:
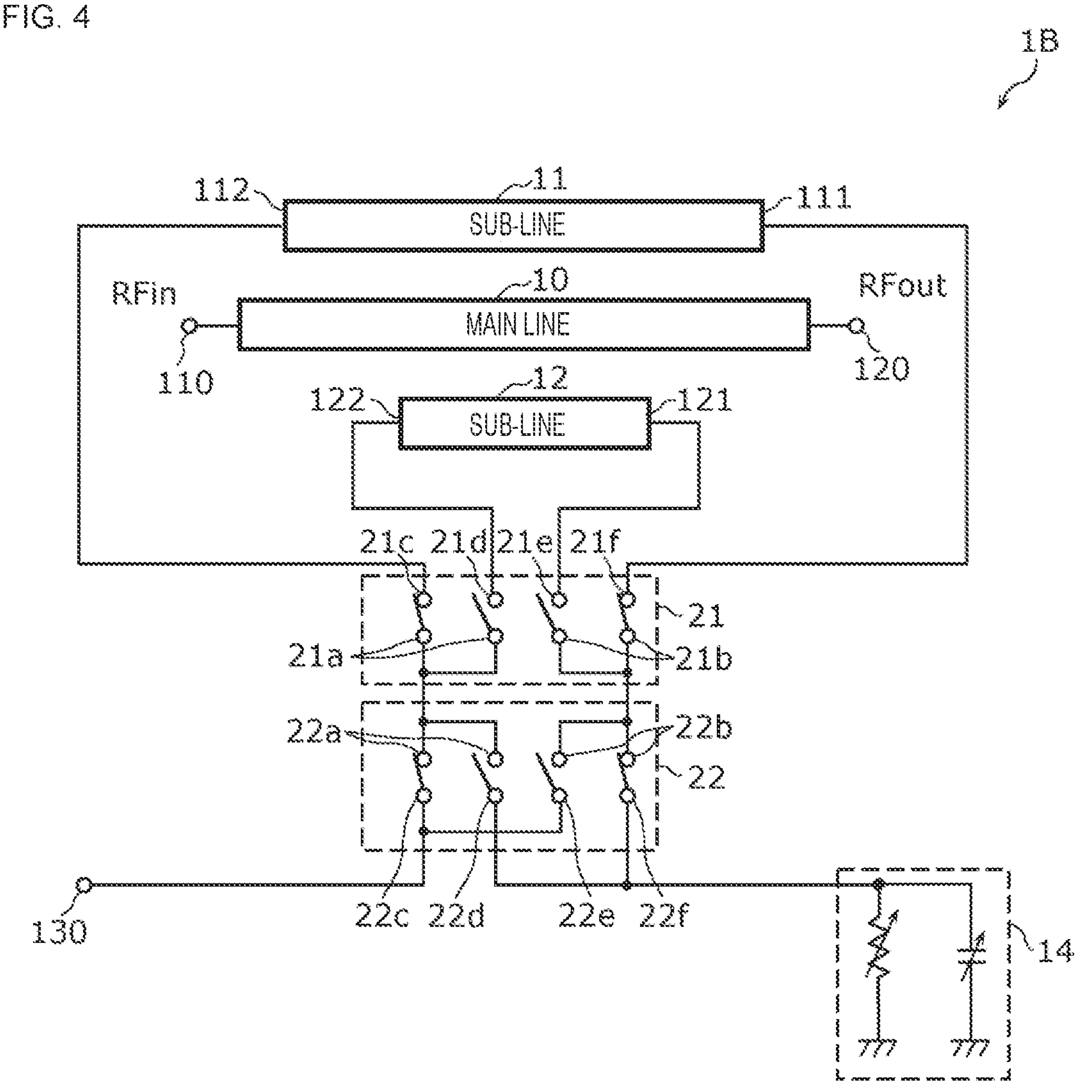
FIG. 4 is a circuit diagram illustrating an example of a functional configuration of a directional coupler according to Modification 2.

FIG. 4 is a circuit diagram illustrating an example of a functional configuration of a directional coupler 1B according to Modification 2. As illustrated in the same figure, the directional coupler 1B includes the main line 10, the sub-lines 11 and 12, the coupling terminal 130, switch circuits 21 and 22, and the termination circuit 14. The directional coupler 1B according to the present modification differs from the directional coupler 1 according to the embodiment in configurations of the switch circuits 21 and 22. Hereinafter, regarding the directional coupler 1B according to the present modification, description of the same configuration as that of the directional coupler 1 according to the embodiment will be omitted, and description will be focused on a different configuration.

The switch circuit 21 is an example of the first switch circuit, and includes terminals 21*a*, 21*b*, 21*c*, 21*d*, 21*e*, and 21*f*. The switch circuit 22 is an example of the second switch circuit, and includes terminals 22*a*, 22*b*, 22*c*, 22*d*, 22*e*, and 22*f*.

The terminals 21*a* are connected to the terminals 22*a*, and the terminals 21*b* are connected to the terminals 22*b*. Further, the terminal 21*c* is connected to the other end 112, the terminal 21*d* is connected to the other end 122, the terminal 21*e* is connected to the one end 121, and the terminal 21*f* is connected to the one end 111. Further, the terminals 22*c* and 22*e* are connected to the coupling terminal 130, and the terminals 22*d* and 22*f* are connected to the termination circuit 14. Further, the terminals 21*a* can be connected to the terminals 21*c* and 21*d*, and the terminals 21*b* can be connected to the terminals 21*e* and 21*f*. Further, the terminals 22*a* can be connected to the terminals 22*c* and 22*d*, and the terminals 22*b* can be connected to the terminals 22*e* and 22*f*.

For example, the terminal 21*a* and the terminal 21*c* are connected to each other, and the terminal 21*b* and the terminal 21*f* are connected to each other, whereby the other end 112 of the sub-line 11 is connected to the terminal 22*a*, and the one end 111 of the sub-line 11 is connected to the terminal 22*b*. Further, the terminal 21*a* and the terminal 21*d* are connected to each other, and the terminal 21*b* and the terminal 21*e* are connected to each other, whereby the other end 122 of the sub-line 12 is connected to the terminal 22*a*, and the one end 121 of the sub-line 12 is connected to the terminal 22*b*. That is, the switch circuit 21 switches between connection between the sub-line 11 and the switch circuit 22 and connection between the sub-line 12 and the switch circuit 22. That is, the switch circuit 21 functions as the first switch circuit that selects the sub-line to be connected to the coupling terminal 130. In addition, in this case, the terminals 21*d* and 21*e* are not connected to any terminals, and thus it is possible to further suppress an increase in insertion loss of the main line 10.

Further, for example, the terminal 22*a* and the terminal 22*c* are connected to each other, and the terminal 22*b* and the terminal 22*f* are connected to each other, whereby the other end 112 of the sub-line 11 is connected to the coupling terminal 130, and the one end 111 of the sub-line 11 is connected to the termination circuit 14. The terminal 22*a* and the terminal 22*d* are connected to each other, and the terminal 22*b* and the terminal 22*e* are connected to each other, whereby the one end 111 of the sub-line 11 is connected to the coupling terminal 130, and the other end 112 of the sub-line 11 is connected to the termination circuit 14. That is, the switch circuit 22 switches connection between the one end 111 and the other end 112 of the sub-line 11 and the coupling terminal 130 and the termination circuit 14. That is, the switch circuit 22 functions as the second switch circuit that switches the directionality of at least one of the sub-lines 11 and 12. This enables the directional coupler 1B to perform bidirectional detection (both a traveling wave and a reflected wave).

That is, the directional coupler 1B according to the present modification has a circuit configuration in which the switch circuit 21 (first switch circuit) for selecting the sub-line and the switch circuit 22 (second switch circuit) for switching the directivity are made to be independent of each other. Accordingly, control of the selecting of the sub-line and control of the switching of the directivity can be performed independently, and thus a configuration of a control program can be simplified.

5. Mounting Configuration of Directional Coupler 1C

Figure 5:
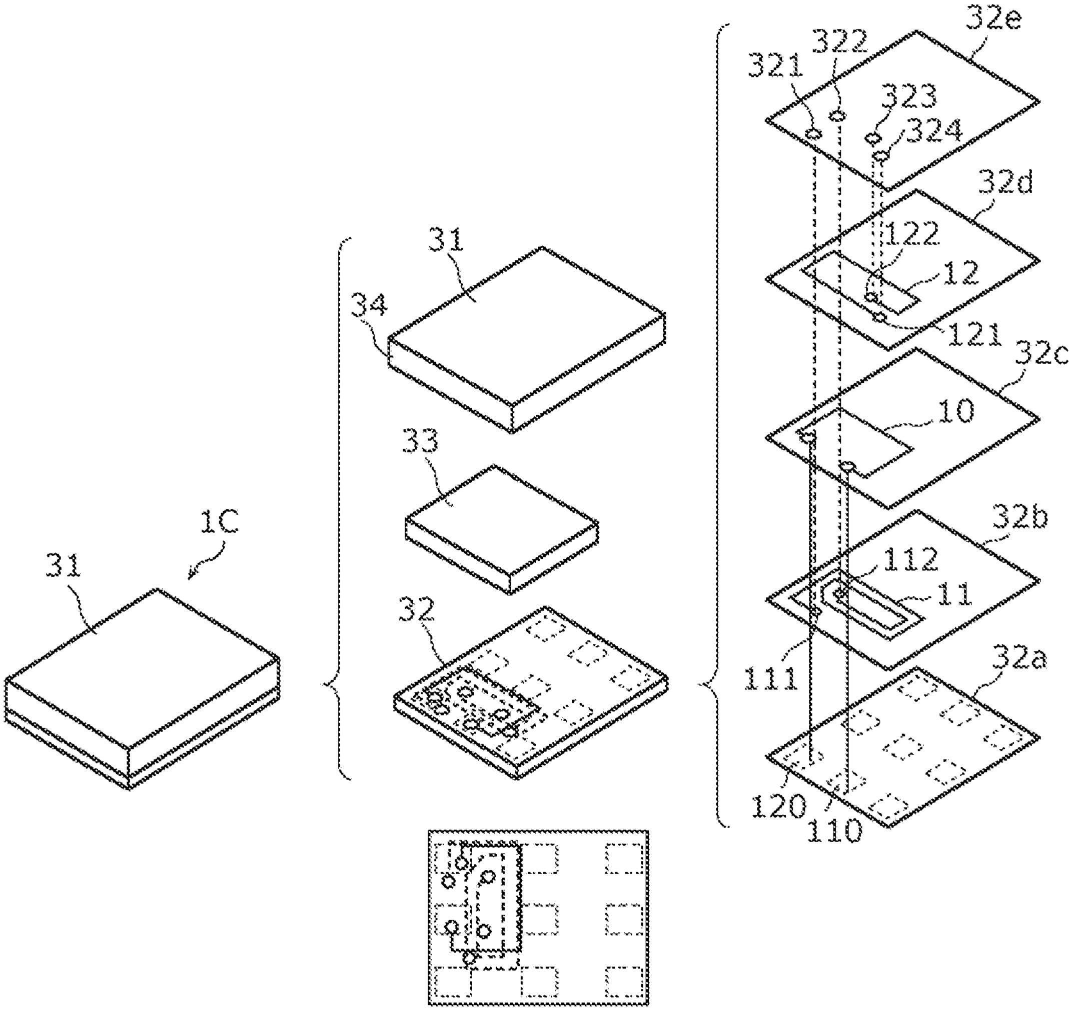
FIG. 5 is a perspective view illustrating an example of a mounting configuration of a directional coupler according to Modification 3.

FIG. 5 is a perspective view illustrating an example of a mounting configuration of a directional coupler 1C according to Modification 3. The directional coupler 1C according to the present modification has the same circuit configuration as that of the directional coupler 1 according to the embodiment and is different from the directional coupler 1 according to the embodiment in that a specific mounting configuration is disclosed. Hereinafter, concerning the directional coupler 1C according to the present modification, description of the same circuit configuration as that of the directional coupler 1 according to the embodiment will be omitted, and description will be focused on the mounting configuration.

The directional coupler 1C is configured with a mounting substrate 32, a semiconductor IC 33, and a resin member 34.

The mounting substrate 32 is a multilayer substrate configured with a plurality of layers having conductor patterns formed thereon, and includes layers 32*a*, 32*b*, 32*c*, 32*d*, and 32*e*, for example. The layers 32*a*, 32*b*, 32*c*, 32*d*, and 32*e* are laminated in this order.

As the mounting substrate 32, for example, a resin-based printed board is used, and as a dielectric material configuring the mounting substrate 32, only a single material such as BT resin, epoxy resin, polyphenylene ether resin, fluorine resin, liquid crystal polymer resin, polyimide resin and the like is used, or these materials are used together with a glass fiber and another filler. Further, as the mounting substrate 32, for example, a glass ceramic substrate is also used. As the conductor pattern of the mounting substrate 32, a copper foil, a thick film of copper or silver, or an alloy film or a composite film of copper, silver, and another metal is used.

External connection electrodes which are the input port 110 and the output port 120 are formed on a rear surface side (a surface on an opposite side to a semiconductor IC 33 side) of the layer 32*a*. A conductor wiring corresponding to the sub-line 11 is formed on the layer 32*b*. A conductor wiring corresponding to the main line 10 is formed on the layer 32*c*. A conductor wiring corresponding to the sub-line 12 is formed on the layer 32*d*. Terminals 321, 322, 323 and 324 connected to the sub-line 11 or 12 are arranged on the layer 32*e*.

The one end 111 of the sub-line 11 disposed on the layer 32*b* is connected to the terminal 321 disposed on the layer 32*e* through a via conductor, and the other end 112 is connected to the terminal 322 disposed on the layer 32*e* through a via conductor. The one end of the main line 10 disposed on the layer 32*c* is connected to the input port 110 disposed on the layer 32*a* through a via conductor, and the other end of the main line 10 is connected to the output port 120 disposed on the layer 32*a* through a via conductor. The one end 121 of the sub-line 12 disposed on the layer 32*d* is connected to the terminal 324 disposed on the layer 32*e* through a via conductor, and the other end 122 is connected to the terminal 323 disposed on the layer 32*e* through a via-conductor. In this way, when the directional coupler 1C is configured so as to include a multilayer body including the plurality of layers, the one end and the other end of each of the sub-lines 11 and 12 may be defined as portions connected to the via conductors connecting between the layers.

The main line 10 and the sub-line 11 at least partially overlap each other when viewed from a laminating direction of the layers 32*a* to 32*e*. Further, the main line 10 and the sub-line 12 at least partially overlap each other when viewed from the laminating direction described above. Here, since the sub-line 11 and the sub-line 12 have different lengths, the degree of coupling of the sub-line 12 with respect to the main line 10 and the degree of coupling of the sub-line 11 with respect to the main line 10 are different from each other.

The semiconductor IC 33 incorporates a control circuit that controls the switch circuit 13 and conduction and non-conduction of the switch circuit 13, and is mounted on the mounting substrate 32. The terminals 13*c* to 13*f* to be connected to the terminals 321 to 324 are disposed on a rear surface side (a mounting substrate 32 side) of the semiconductor IC 33. The semiconductor IC 33 is flip-chip mounted on the mounting substrate 32 by, for example, solder bumps, and is covered with the resin member 34. The resin member 34 is, for example, epoxy-based resin, and the semiconductor IC 33 is transfer molded. Note that underfill resin may be further used as the resin member 34 in combination. Further, a metal shield film 31 may be formed on at least a part of a top surface and a side surface of the resin member 34.

The termination circuit 14 may be formed by a conductor pattern in the mounting substrate 32, or may be formed by using an inductor and a capacitor that have a chip shape and that are mounted on the mounting substrate 32. In a case where the termination circuit 14 is a variable-type termination circuit, a configuration may be adoptable in which necessary components are connected in parallel among three types of a variable shunt resistor, a variable shunt capacitor, and a shunt circuit in which a variable inductor and a resistance element are connected in series. Note that the variable operation is performed by using a switch using a transistor to connect or disconnect a desired circuit element.

Note that the main line 10, the sub-line 11, and the sub-line 12 may be formed in the semiconductor IC 33 instead of the mounting substrate 32.

According to the mounting configuration described above, the mounting substrate 32 incorporates the main line 10, the sub-line 11, and the sub-lines 12, so that a space in the mounting substrate 32 can be effectively utilized. Further, since these lines are not provided in the semiconductor IC 33, it is possible to further miniaturize the semiconductor IC 33. Further, since the main line 10 is disposed only in the mounting substrate 32 having good linearity with respect to a radio frequency signal with high output power, and the semiconductor IC 33 can avoid transmitting a signal with high output power, it is possible to minimize distortion of a radio frequency signal that is transmitted through the main line 10, and it is possible to improve mounting reliability against bending, thermal stress, and the like of the semiconductor IC 33. Further, since the main line 10 is disposed in the mounting substrate 32 and is not connected to the semiconductor IC 33, a possibility that a signal flowing through the semiconductor IC 33 is cut is reduced, and thus the reliability can be improved.

Further, although processing accuracy of the wire widths or the like of the main line 10, the sub-line 11, and the sub-line 12 is likely to be low and variation in the characteristics thereof is likely to occur, compared with a case where these lines are provided in the semiconductor IC 33, it is possible to suppress the occurrence of the variation in characteristics such as directionality by providing the variable-type termination circuit 14 and the like to be able to perform adjustment.

Figure 6:
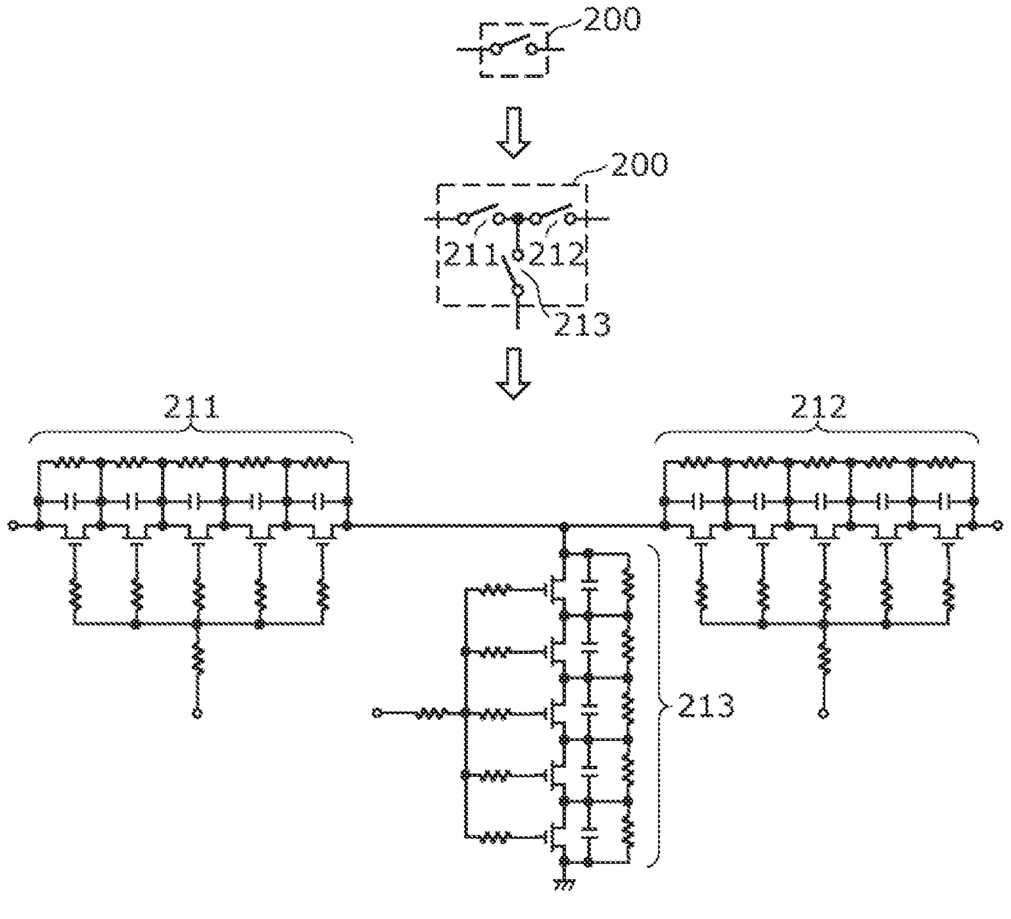
FIG. 6 is a circuit diagram illustrating an example of a configuration of switches of the directional coupler according to the embodiment.

FIG. 6 is a circuit diagram illustrating an example of a configuration of switches of the directional coupler 1 according to the embodiment. The switch circuit 13 of the directional coupler 1 is configured with a plurality of switches, and the switch 200 illustrated in FIG. 6 exemplifies, for example, one of the plurality of switches configuring the switch circuit 13.

As illustrated in FIG. 6, the switch 200 is configured with switch elements 211, 212, and 213. Each of the switch elements 211, 212 and 213 has a configuration in which a plurality of transistors is connected in multiple stages, as illustrated in the lower part of FIG. 6. The number of multi-stage connections of the transistors is determined by a required withstand voltage. Conduction and non-conduction of each switch element are controlled by a control voltage to be applied to a gate terminal via a resistance element. In addition, a capacitor and a resistance element are appropriately connected to each transistor in order to compensate for passing characteristics of a direct current signal and an alternating current signal.

In order to ensure good isolation characteristics, the switch circuit according to the present embodiment is configured with the two switch elements 211 and 212 connected in series and the switch element 213 connected between a connection node of the switch elements 211 and 212 and a ground. That is, the switch 200 configures a series/shunt/series substantially T-shaped switch.

For example, in response to the switch 200 being turned into a non-conductive state, the switch elements 211 and 212 are turned into a non-conductive state and the switch element 213 is turned into a conductive state, whereby the isolation characteristics of the switch 200 can be improved.

In addition, in response to the switch 200 being turned into a conductive state, the switch elements 211 and 212 are turned into a non-conductive state, and the switch element 213 is also turned into a non-conductive state, whereby an increase in insertion loss of the switch 200 can be suppressed.

Note that the switches configuring the switch circuit according to the present embodiment may be a series/shunt or shunt/series substantially L-shaped switch.

6. Circuit Configuration of Directional Coupler 1D

Figure 7:
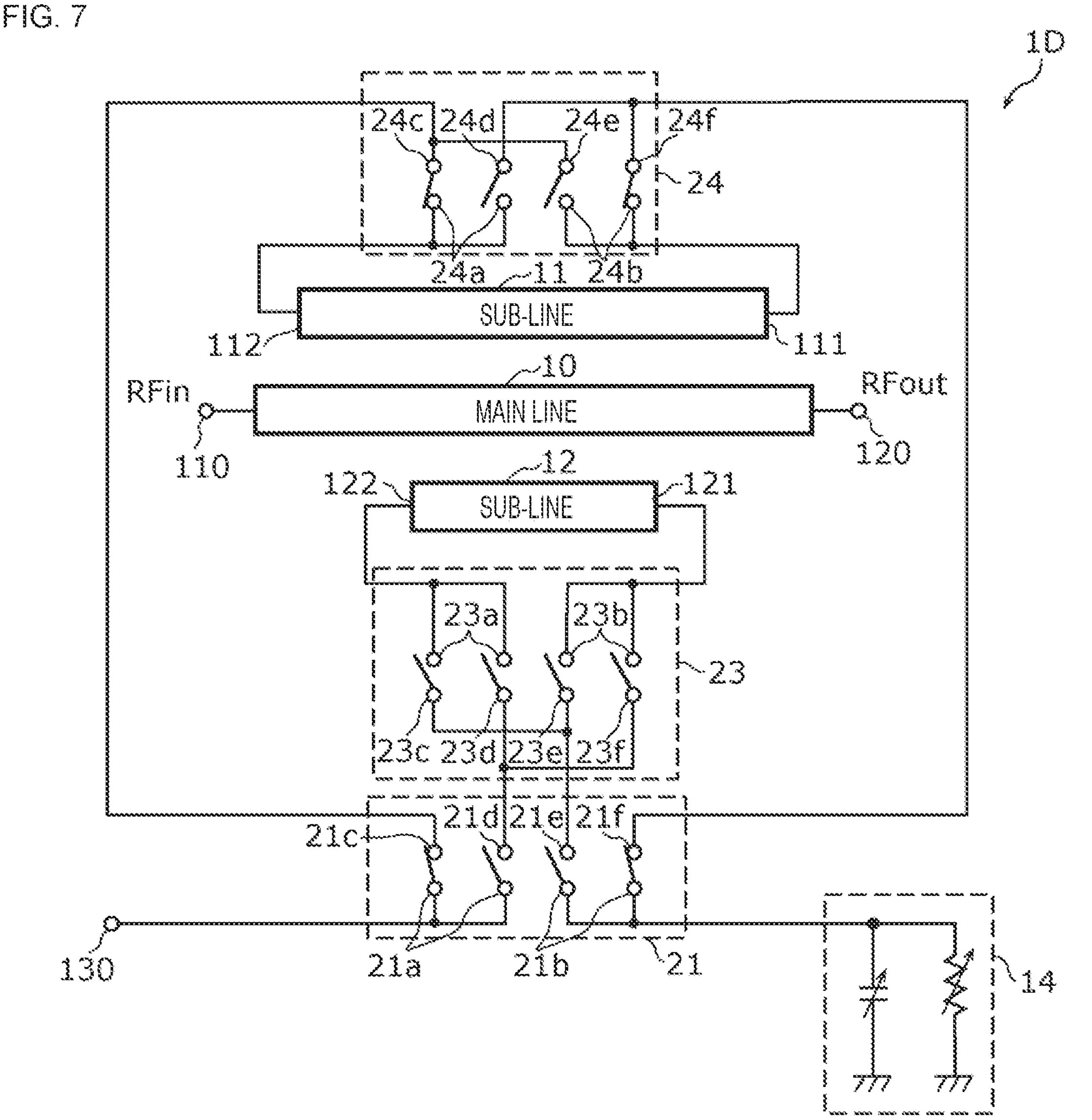
FIG. 7 is a circuit diagram illustrating an example of a functional configuration of a directional coupler according to Modification 4.

FIG. 7 is a circuit diagram illustrating an example of a functional configuration of a directional coupler 1D according to Modification 4. As illustrated in the same figure, the directional coupler 1D includes the main line 10, the sub-lines 11 and 12, the coupling terminal 130, the switch circuits 21, 23, and 24, and the termination circuit 14. The directional coupler 1D according to the present modification differs from the directional coupler 1B according to Modification 2 in configurations of the switch circuits 23 and 24. Hereinafter, concerning the directional coupler 1D according to the present modification, description of the same configuration as that of the directional coupler 1B according to Modification 2 will be omitted, and description will be focused on a configuration different from that of the directional coupler 1B according to Modification 2.

The switch circuit 21 is an example of the first switch circuit, and includes terminals 21*a*, 21*b*, 21*c*, 21*d*, 21*e*, and 21*f*. The switch circuit 23 is an example of the second switch circuit, and includes terminals 23*a*, 23*b*, 23*c*, 23*d*, 23*e*, and 23*f*. The switch circuit 24 is an example of the second switch circuit, and includes terminals 24*a*, 24*b*, 24*c*, 24*d*, 24*e*, and 24*f*.

The terminals 21*a* are connected to the coupling terminal 130, and the terminals 21*b* are connected to the termination circuit 14. Additionally, the terminal 21*c* is connected to the terminals 24*c* and 24*e*, the terminal 21*d* is connected to the terminals 23*d* and 23*f*, the terminal 21*e* is connected to the terminals 23*c* and 23*e*, and the terminal 21*f* is connected to the terminals 24*d* and 24*f*. In addition, the terminals 23*a* are connected to the other end 122, and the terminals 23*b* are connected to the one end 121. In addition, the terminals 24*a* are connected to the other end 112, and the terminals 24*b* are connected to the one end 111. Further, the terminals 21*a* can be connected to the terminals 21*c* and 21*d*, and the terminals 21*b* can be connected to the terminals 21*e* and 21*f*. Further, the terminals 23*a* can be connected to the terminals 23*c* and 23*d*, and the terminals 23*b* can be connected to the terminals 23*e* and 23*f*. Further, the terminals 24*a* can be connected to the terminals 24*c* and 24*d*, and the terminals 24*b* can be connected to the terminals 24*e* and 24*f*.

For example, the terminal 23*a* and the terminal 23*c* are connected to each other, and the terminal 23*b* and the terminal 23*f* are connected to each other, whereby the other end 122 of the sub-line 12 is connected to the termination circuit 14 via the terminal 21*e*, and the one end 121 of the sub-line 12 is connected to the coupling terminal 130 via the terminal 21*d*. Further, the terminal 23*a* and the terminal 23*d* are connected to each other, and the terminal 23*b* and the terminal 23*e* are connected to each other, whereby the one end 121 of the sub-line 12 is connected to the termination circuit 14 via the terminal 21*e*, and the other end 122 of the sub-line 12 is connected to the coupling terminal 130 via the terminal 21*d*. That is, the switch circuit 23 switches connection between the one end 121 and the other end 122 of the sub-line 12 and the coupling terminal 130 and the termination circuit 14. That is, the switch circuit 23 functions as the second switch circuit that switches the directionality of the sub-line 12. This allows the directional coupler 1D to perform bidirectional detection.

Further, for example, the terminal 24*a* and the terminal 24*c* are connected to each other, and the terminal 24*b* and the terminal 24*f* are connected to each other, whereby the other end 112 of the sub-line 11 is connected to the coupling terminal 130 via the terminal 21*c*, and the one end 111 of the sub-line 11 is connected to the termination circuit 14 via the terminal 21*f*. Further, the terminal 24*a* and the terminal 24*d* are connected to each other and the terminal 24*b* and the terminal 24*e* are connected to each other, whereby the one end 111 of the sub-line 11 is connected to the coupling terminal 130 via the terminal 21*c*, and the other end 112 of the sub-line 11 is connected to the termination circuit 14 via the terminal 21*f*. That is, the switch circuit 24 switches connection between the one end 111 and the other end 112 of the sub-line 11 and the coupling terminal 130 and the termination circuit 14. That is, the switch circuit 24 functions as the second switch circuit that switches the directionality of the sub-line 11. This allows the directional coupler 1D to perform bidirectional detection.

That is, the directional coupler 1D according to the present modification has a circuit configuration in which the switch circuit 23 (second switch circuit) that switches the directionality of the sub-line 12 and the switch circuit (second switch circuit) that switches the directivity of the sub-line 11 are made to be independent of each other. In other words, the switch circuit 21 and the switch circuit 24 are provided individually for the sub-line 11, and the switch circuit 21 and the switch circuit 23 are provided individually for the sub-line 12. Accordingly, the sub-line which is not selected is disconnected from the coupling terminal 130 in two stages that are a switch for switching the directionality (second switch circuit) and a switch for selecting the sub-line (first switch circuit). Therefore, an unwanted signal from the sub-line that is not selected can be blocked with high isolation. Note that, in the connection example illustrated in FIG. 7, the sub-line 12 that is not selected is disconnected in the two stages of the switch circuits 23 and 21 with high isolation.

Note that, in the directional coupler 1D by adopting the circuit configuration in which the switch circuits 23 and 24 are made to be independent of each other, the first switch circuit and the second switch circuit are provided individually for the sub-lines 11 and 12, but the first switch circuit and the second switch circuit may be provided individually for the sub-lines 11 and 12 by adopting a circuit configuration in which the first switch circuits are made to be independent of each other. Further, the first switch circuit and the second switch circuit may be provided individually for the sub-lines 11 and 12 by adopting a circuit configuration in which the first switch circuits are made to be independent of each other and the second switch circuits are made to be independent of each other.

7. Circuit Configuration of Directional Coupler 1E

Figure 8:
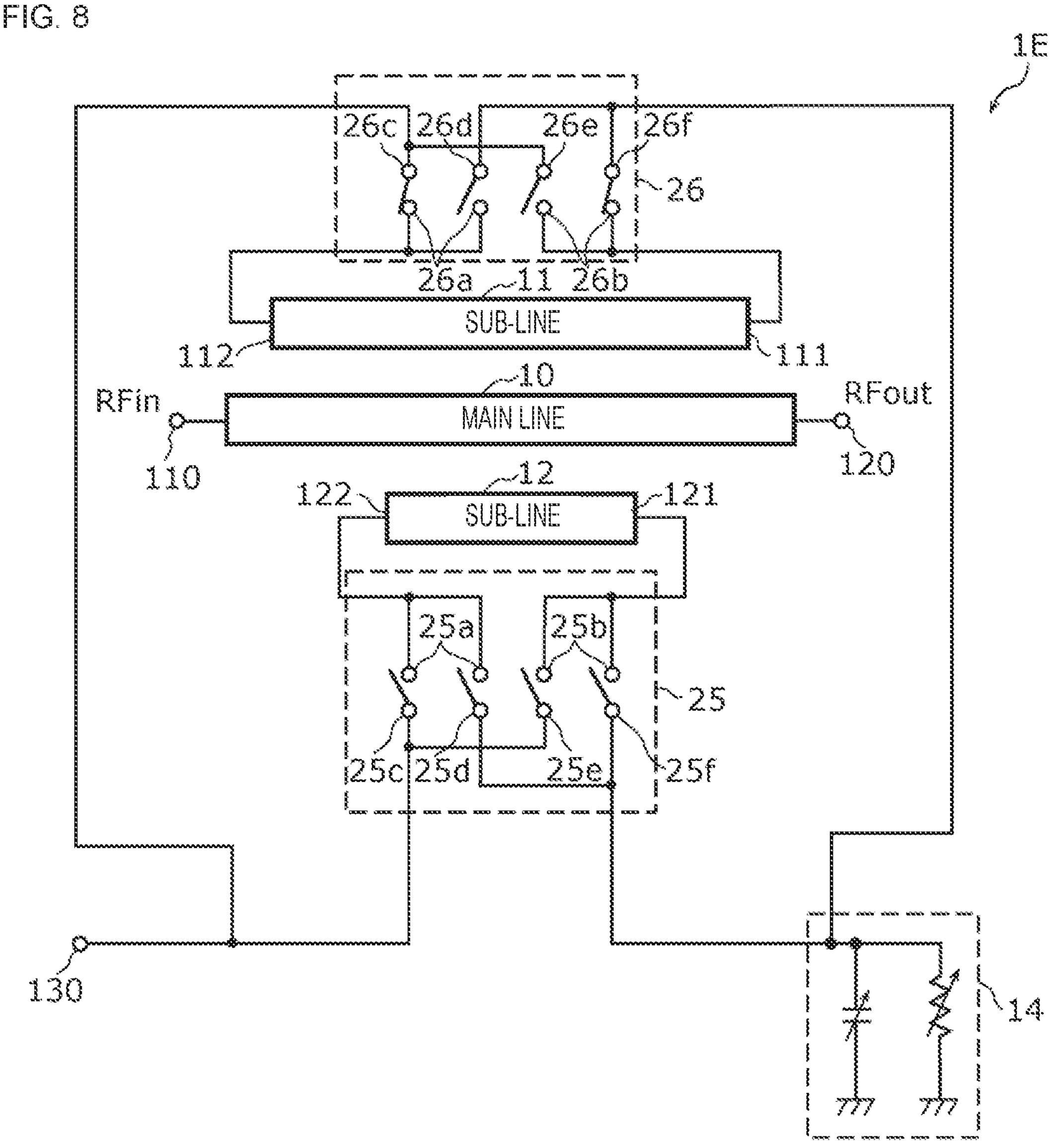
FIG. 8 is a circuit diagram illustrating an example of a functional configuration of a directional coupler according to Modification 5.

FIG. 8 is a circuit diagram illustrating an example of a functional configuration of a directional coupler 1E according to Modification 5. As illustrated in the same figure, the directional coupler 1E includes the main line 10, the sub-lines 11 and 12, the coupling terminal 130, switch circuits 25 and 26, and the termination circuit 14. The directional coupler 1E according to the present modification differs from the directional coupler 1B according to Modification 2 in configurations of the switch circuits 25 and 26. Hereinafter, concerning the directional coupler 1E according to the present modification, description of the same configuration as that of the directional coupler 1B according to Modification 2 will be omitted, and description will be focused on a different configuration.

The switch circuit 25 is an example of the first switch circuit and an example of the second switch circuit, and includes terminals 25*a*, 25*b*, 25*c*, 25*d*, 25*e*, and 25*f*. The terminals 25*a* are connected to the other end 122, the terminals 25*b* are connected to the one end 121, the terminals 25*c* and 25*e* are connected to the coupling terminal 130, and the terminals 25*d* and 25*f* are connected to the termination circuit 14. Further, the terminals 25*a* can be connected to the terminals 25*c* and 25*d*, and the terminals 25*b* can be connected to the terminals 25*e* and 25*f*.

For example, the terminal 25*a* and the terminal 25*c* are connected to each other, and the terminal 25*b* and the terminal 25*f* are connected to each other, whereby the other end 122 of the sub-line 12 is connected to the coupling terminal 130, and the one end 121 of the sub-line 12 is connected to the termination circuit 14. Further, the terminal 25*a* and the terminal 25*d* are connected to each other, and the terminal 25*b* and the terminal 25*e* are connected to each other, whereby the one end 121 of the sub-line 12 is connected to the coupling terminal 130, and the other end 122 of the sub-line 12 is connected to the termination circuit 14. That is, the switch circuit 25 switches connection between the one end 121 and the other end 122 of the sub-line 12 and the coupling terminal 130 and the termination circuit 14.

According to the above-described connection configuration, the switch circuit 25 functions as the first switch circuit that switches between connection and non-connection between the coupling terminal 130 and the sub-line 12, and also functions as the second switch circuit that switches the directionality of the sub-line 12.

The switch circuit 26 is an example of the first switch circuit and an example of the second switch circuit, and includes terminals 26*a*, 26*b*, 26*c*, 26*d*, 26*e*, and 26*f*. The terminals 26*a* are connected to the other end 112, the terminals 26*b* are connected to one end 111, the terminals 26*c* and 26*e* are connected to the coupling terminal 130, and the terminals 26*d* and 26*f* are connected to the termination circuit 14. Further, the terminals 26*a* can be connected to the terminals 26*c* and 26*d*, and the terminals 26*b* can be connected to the terminals 26*e* and 26*f*.

For example, as illustrated in FIG. 8, the terminal 26*a* and the terminal 26*c* are connected to each other, and the terminal 26*b* and the terminal 26*f* are connected to each other, whereby the other end 112 of the sub-line 11 is connected to the coupling terminal 130, and the one end 111 of the sub-line 11 is connected to the termination circuit 14. In addition, the terminal 26*a* and the terminal 26*d* are connected to each other and the terminal 26*b* and the terminal 26*e* are connected to each other, whereby the one end 111 of the sub-line 11 is connected to the coupling terminal 130, and the other end 112 of the sub-line 11 is connected to the termination circuit 14. That is, the switch circuit 26 switches connection between the one end 111 and the other end 112 of the sub-line 11 and the coupling terminal 130 and the termination circuit 14.

According to the above-described connection configuration, the switch circuit 26 functions as the first switch circuit that switches between connection and non-connection between the coupling terminal 130 and the sub-line 11, and also functions as the second switch circuit that switches the directionality of the sub-line 11.

According to this, since each of the switch circuits 25 and 26 serves as both the switch for switching the directionality (the second switch circuit) and the switch for selecting the sub-line (the first switch circuit), a scale of the switch circuit can be reduced.

8. Circuit Configuration of Directional Coupler 1F

Figure 9:
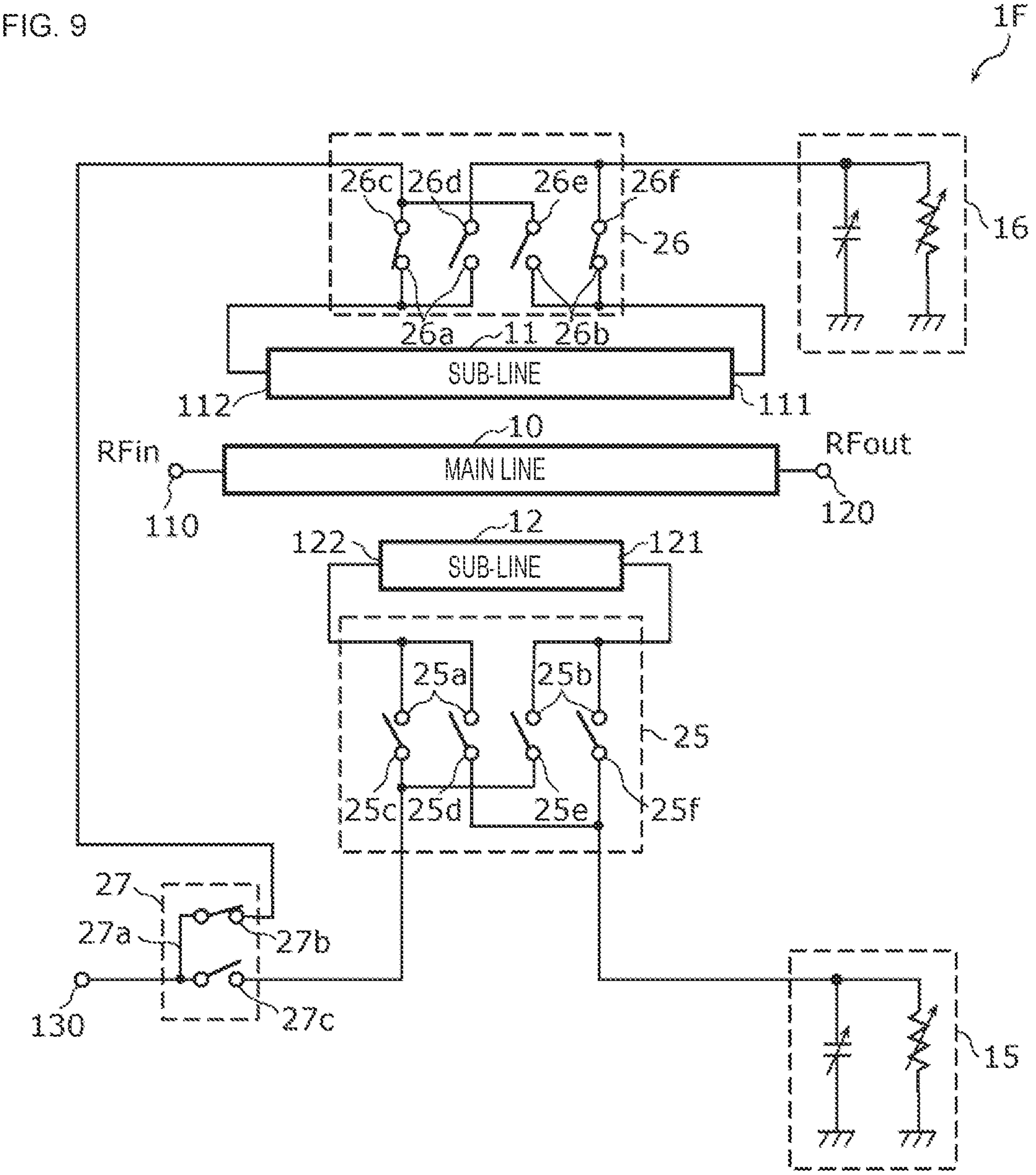
FIG. 9 is a circuit diagram illustrating an example of a functional configuration of a directional coupler according to Modification 6.

FIG. 9 is a circuit diagram illustrating an example of a functional configuration of a directional coupler 1F according to Modification 6. As illustrated in the same figure, the directional coupler 1F includes the main line 10, the sub-lines 11 and 12, the coupling terminal 130, the switch circuits 25, 26, a switch circuit 27, and termination circuits 15 and 16. The directional coupler 1F according to the present modification differs from the directional coupler 1E according to Modification 5 in configurations of the termination circuits 15 and 16, and the switch circuit 27. Hereinafter, concerning the directional coupler 1F according to the present modification, description of the same configuration as that of the directional coupler 1E according to Modification 5 will be omitted, and description will be focused on a different configuration.

The termination circuit 15 is a circuit that is connected to the sub-line 12 via the switch circuit 25, and terminates the sub-line 12. Note that the termination circuit 15 may be a termination circuit in which a termination impedance is variable. The termination circuit 16 is a circuit that is connected to the sub-line 11 via the switch circuit 26, and terminates the sub-line 11. Note that the termination circuit 16 may be a termination circuit in which a termination impedance is variable.

The switch circuit 27 has terminals 27*a*, 27*b*, and 27*c*, and switches between connection between the coupling terminal 130 and the sub-line 11 and connection between the coupling terminal 130 and the sub-line 12.

The terminal 27*c* is connected to the terminals 25*c* and 25*e*, the terminal 27*b* is connected to the terminals 26*c* and 26*e*, and the terminals 27*a* are connected to the coupling terminal 130.

According to this, the sub-line which is not selected is disconnected from the coupling terminal 130 in two stages that are the switch circuit 25 or 26 and the switch circuit 27. Therefore, an unwanted signal from the sub-line that is not selected can be blocked with high isolation. Note that in the connection example illustrated in FIG. 9, the sub-line 12 that is not selected is disconnected in two stages that are the switch circuits 25 and 27 with high isolation.

In addition, the termination circuits 15 and 16 are once adjusted, the termination circuits do not need to be re-adjusted every time when the selection of the sub-line 11 and the sub-line 12 is switched, so that the termination control can be simplified. Further, even when the sub-lines are switched in time division at high speed, a loss load of the termination circuit device can be reduced and distributed.

9. Circuit Configuration of Directional Coupler 1G

Figure 10:
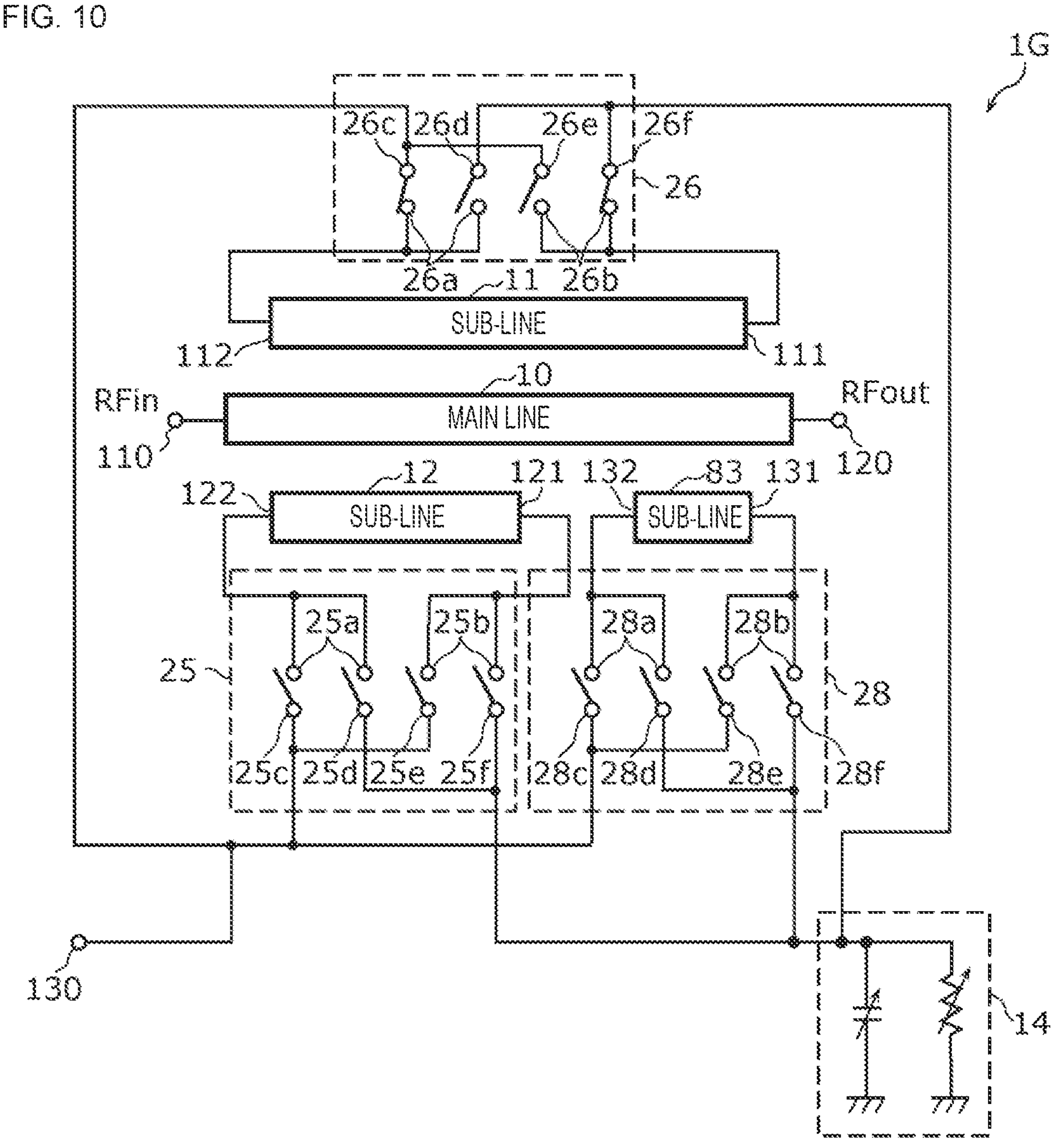
FIG. 10 is a circuit diagram illustrating an example of a functional configuration of a directional coupler according to Modification 7.

FIG. 10 is a circuit diagram illustrating an example of a functional configuration of a directional coupler 1G according to Modification 7. As illustrated in the same figure, the directional coupler 1G includes the main line 10, the sub-lines 11, 12, a sub-line 83, the coupling terminal 130, the switch circuits 25, 26, a switch circuit 28, and the termination circuit 14. The directional coupler 1G according to the present modification differs from the directional coupler 1E according to Modification 5 in that the sub-line 83 and the switch circuit 28 are added. Hereinafter, concerning the directional coupler 1G according to the present modification, description of the same configuration as that of the directional coupler 1E according to Modification 5 will be omitted, and description will be focused on a different configuration.

The sub-line 83 has one end 131 and the other end 132. The main line 10 and the sub-line 83 are electromagnetically coupled to each other. The sub-line 11, the sub-line 12, and the sub-line 83 are different from one another in length. In the present modification, the sub-line 11 is longer than the sub-line 12, and the sub-line 12 is longer than the sub-line 83.

In addition, in the present modification, the sub-line 11 and the sub-line 12 are arranged with the main line 10 interposed therebetween. Also, the sub-line 11 and the sub-line 83 are arranged with the main line 10 interposed therebetween. That is, the sub-line 12 and the sub-line 83 are arranged on the same side with respect to the main line 10. Note that the arrangement of the sub-lines 11, 12, and 83 with respect to the main line 10 is not limited thereto.

The switch circuit 28 is an example of the first switch circuit and an example of the second switch circuit, and includes terminals 28*a*, 28*b*, 28*c*, 28*d*, 28*e*, and 28*f*. The terminals 28*a* are connected to the other end 132, the terminals 28*b* are connected to the one end 131, the terminals 28*c* and 28*e* are connected to the coupling terminal 130, and the terminals 28*d* and 28*f* are connected to the termination circuit 14. Further, the terminals 28*a* can be connected to the terminals 28*c* and 28*d*, and the terminals 28*b* can be connected to the terminals 28*e* and 28*f*.

For example, the terminal 28*a* and the terminal 28*c* are connected to each other, and the terminal 28*b* and the terminal 28*f* are connected to each other, whereby the other end 132 of the sub-line 83 is connected to the coupling terminal 130, and the one end 131 of the sub-line 83 is connected to the termination circuit 14. Further, the terminal 28*a* and the terminal 28*d* are connected to each other and the terminal 28*b* and the terminal 28*e* are connected to each other, whereby the one end 131 of the sub-line 83 is connected to the coupling terminal 130, and the other end 132 of the sub-line 83 is connected to the termination circuit 14. That is, the switch circuit 28 switches connection between the one end 131 and the other end 132 of the sub-line 83 and the coupling terminal 130 and the termination circuit 14.

According to the above-described connection configuration, the switch circuit 28 functions as the first switch circuit that switches between connection and non-connection between the coupling terminal 130 and the sub-line 83, and also functions as the second switch circuit that switches the directionality of the sub-line 83.

The directional coupler 1G according to the present modification can apply, for example, the sub-line 83 to a high frequency band, the sub-line 12 to an intermediate frequency band, and the sub-line 11 to a low frequency band.

Each of the switch circuits 25, 26, and 28 serves as both the switch for switching the directionality (second switch circuit) and the switch for selecting the sub-line (first switch circuit), so that it is possible to maintain a desired range for a degree of coupling and a low insertion loss in a wide band including a high frequency band, an intermediate frequency band, and a low frequency band while reducing the scale of the switch circuit.

10. Circuit Configuration of Directional Coupler 1H

Figure 11:
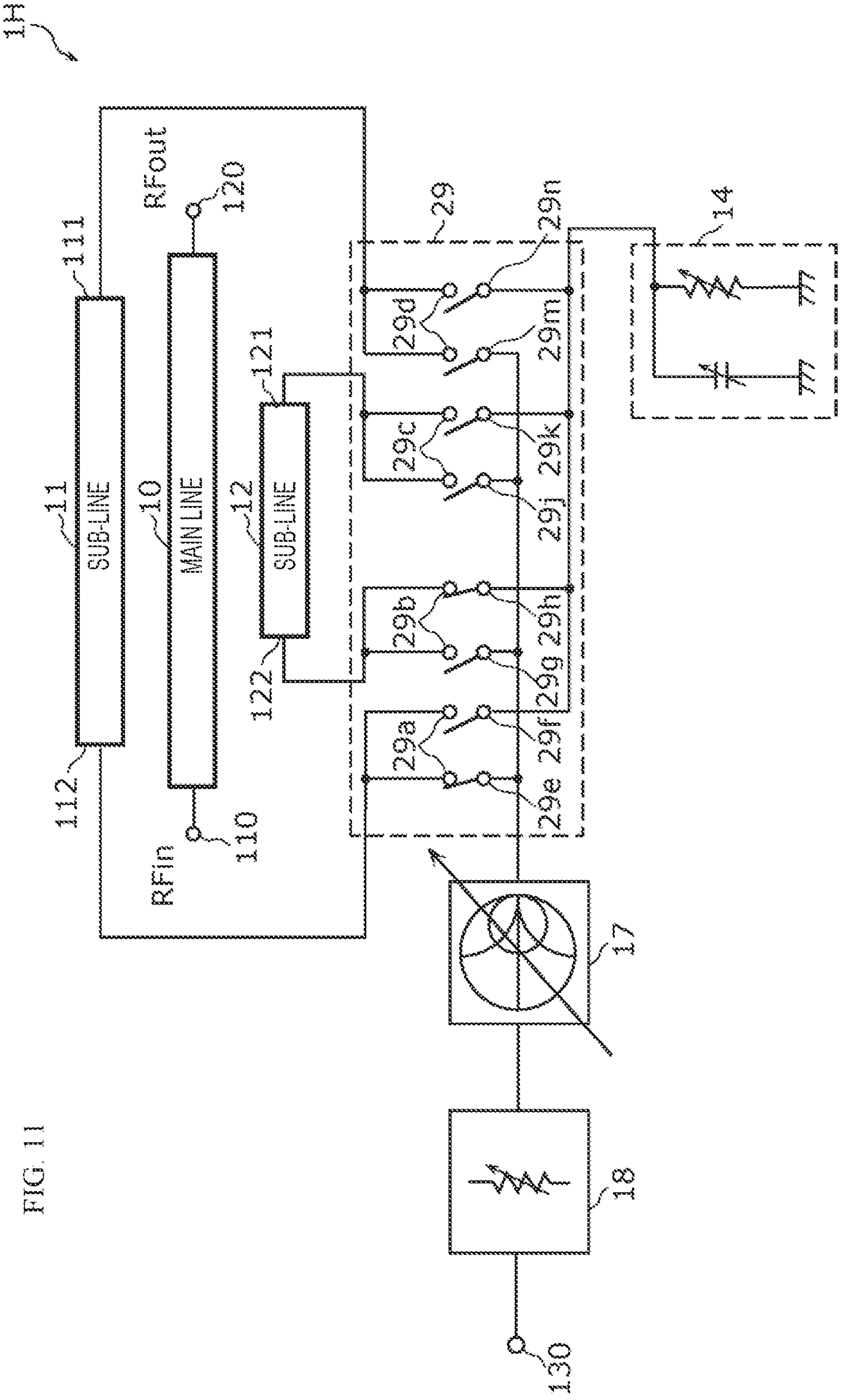
FIG. 11 is a circuit diagram illustrating an example of a functional configuration of a directional coupler according to Modification 8.

FIG. 11 is a circuit diagram illustrating an example of a functional configuration of a directional coupler 1H according to Modification 8. As illustrated in the same figure, the directional coupler 1H includes the main line 10, the sub-lines 11 and 12, the coupling terminal 130, a switch circuit 29, the termination circuit 14, a variable matching circuit 17, and a variable attenuation circuit 18. The directional coupler 1H according to the present modification differs from the directional coupler 1E according to Modification 5 in configurations of the switch circuit 29 and the addition of the variable matching circuit 17 and the variable attenuation circuit 18. Hereinafter, concerning the directional coupler 1H according to the present modification, description of the same configuration as that of the directional coupler 1E according to Modification 5 will be omitted, and description will be focused on a different configuration.

The switch circuit 29 is an example of the first switch circuit and an example of the second switch circuit, and includes terminals 29*a*, 29*b*, 29*c*, 29*d*, 29*e*, 29*f*, 29*g*, 29*h*, 29*j*, 29*k*, 29*m*, and 29*n*. The terminals 29*a* are connected to the other end 112, the terminals 29*b* are connected to the other end 122, the terminals 29*c* are connected to the one end 121, and the terminals 29*d* are connected to the one end 111. Further, the terminals 29*e*, 29*g*, 29*j*, and 29*m* are connected to the coupling terminal 130 via the variable matching circuit 17 and the variable attenuation circuit 18, and the terminals 29*f*, 29*h*, 29*k*, and 29*n* are connected to the termination circuit 14. Additionally, the terminals 29*a* can be connected to the terminals 29*e* and 29*f*, the terminals 29*b* can be connected to the terminals 29*g* and 29*h*, the terminals 29*c* can be connected to the terminals 29*j* and 29*k*, and the terminals 29*d* can be connected to the terminals 29*m* and 29*n*.

For example, as illustrated in FIG. 11, the terminal 29*a* and the terminal 29*e* are connected to each other, and the terminal 29*d* and the terminal 29*n* are connected to each other, whereby the other end 112 of the sub-line 11 is connected to the coupling terminal 130 via the variable matching circuit 17 and the variable attenuation circuit 18, and the one end 111 of the sub-line 11 is connected to the termination circuit 14. Further, for example, the terminal 29*a* and the terminal 29*f* are connected to each other, and the terminal 29*d* and the terminal 29*m* are connected to each other, whereby the one end 111 of the sub-line 11 is connected to the coupling terminal 130 via the variable matching circuit 17 and the variable attenuation circuit 18, and the other end 112 of the sub-line 11 is connected to the termination circuit 14. That is, the switch circuit 29 switches connection between the one end 111 and the other end 112 of the sub-line 11 and the coupling terminal 130 and the termination circuit 14.

Further, for example, the terminal 29*b* and the terminal 29*g* are connected to each other, and the terminal 29*c* and the terminal 29*k* are connected to each other, so that the other end 122 of the sub-line 12 is connected to the coupling terminal 130 via the variable matching circuit 17 and the variable attenuation circuit 18, and the one end 121 of the sub-line 12 is connected to the termination circuit 14. Further, for example, the terminal 29*b* and the terminal 29*h* are connected to each other, and the terminal 29*c* and the terminal 29*j* are connected to each other, whereby the one end 121 of the sub-line 12 is connected to the coupling terminal 130 via the variable matching circuit 17 and the variable attenuation circuit 18, and the other end 122 of the sub-line 12 is connected to the termination circuit 14. That is, the switch circuit 29 switches connection between the one end 121 and the other end 122 of the sub-line 12 and the coupling terminal 130 and the termination circuit 14.

Further, the switch circuit 29 switches between connection between the sub-line 11 and the coupling terminal 130 and connection between the sub-line 12 and the coupling terminal 130.

The variable matching circuit 17 is disposed between the coupling terminal 130 and the switch circuit 29. The variable matching circuit 17 is configured with, for example, a passive element such as an inductor, a capacitor and the like, and a switch. By varying an impedance and a phase according to a frequency band to be detected, the variable matching circuit 17 makes it possible to match an impedance when viewing a side of the switch circuit 29 from the variable matching circuit 17 with an impedance when viewing a side of the coupling terminal 130 from the variable matching circuit 17.

The variable attenuation circuit 18 is connected between the variable matching circuit 17 and the coupling terminal 130. By adjusting an attenuation rate of the variable attenuation circuit 18, a magnitude of a detection signal that changes according to the frequency band to be detected can be leveled, and the detection accuracy can be stabilized.

According to the above-described configuration, it is possible to obtain a desired degree of coupling by switching between the sub-lines 11 and 12 and appropriately adjusting the variable attenuation circuit 18 with respect to a frequency point to be detected and with respect to directions of traveling and reflection. Further, it is possible to obtain desired directionality by appropriately adjusting the termination circuit 14 and the variable matching circuit 17 with respect to the frequency point to be detected and with respect to the directions of the traveling and the reflection.

Note that a variable filter may be disposed between the sub-lines 11 and 12 and the coupling terminal 130.

11. Circuit Configuration of Directional Coupler 1J

Figure 12:
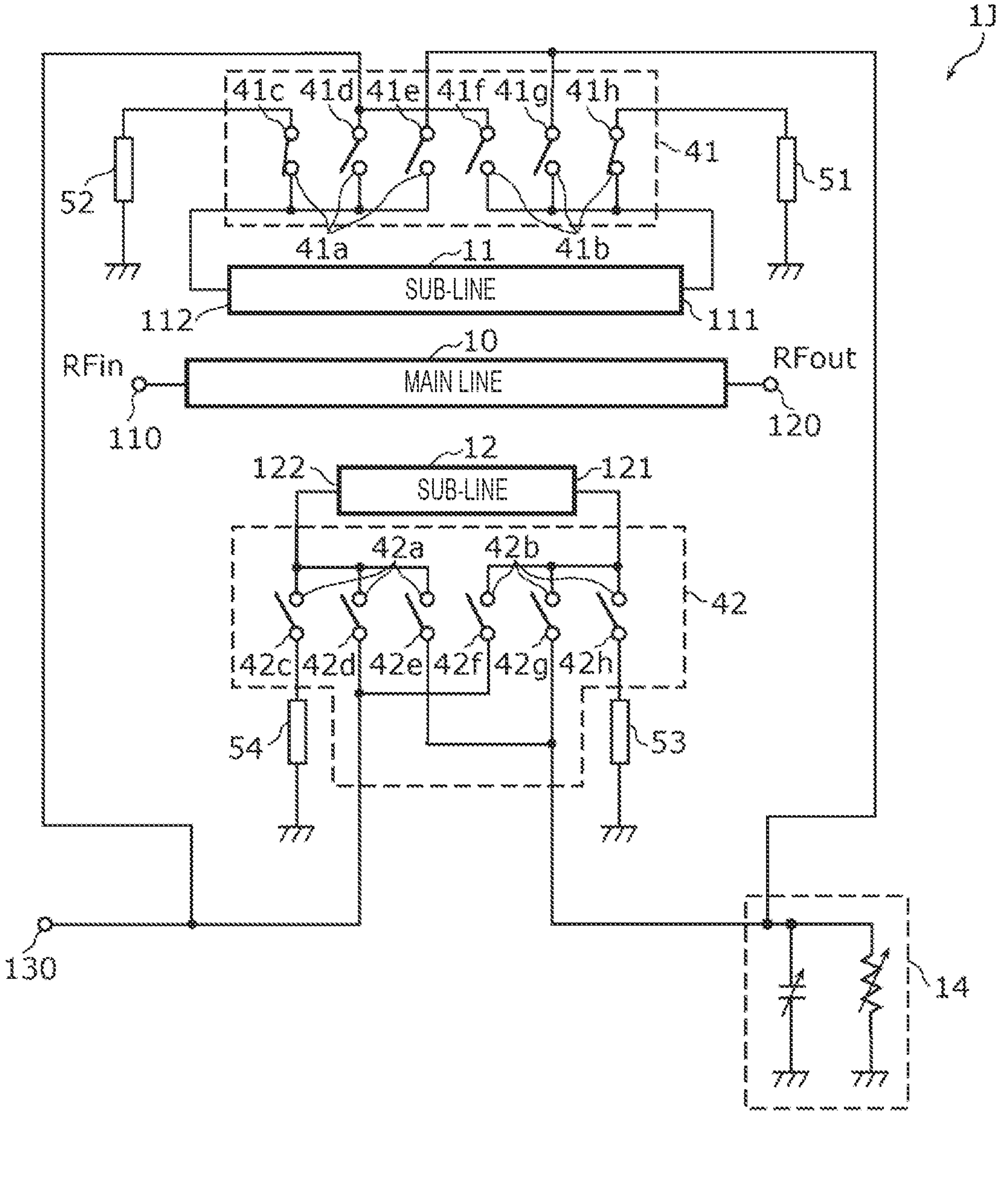
FIG. 12 is a circuit diagram illustrating an example of a functional configuration of a directional coupler according to Modification 9.

FIG. 12 is a circuit diagram illustrating an example of a functional configuration of a directional coupler 1J according to Modification 9. As illustrated in the same figure, the directional coupler 1J includes the main line 10, the sub-lines 11 and 12, the coupling terminal 130, switch circuits 41 and 42, loaded circuits 51, 52, 53, and 54, and the termination circuit 14. The directional coupler 1J according to the present modification differs from the directional coupler 1E according to Modification 5 in configurations of the switch circuits 41 and 42 and the addition of the loaded circuits 51 to 54. Hereinafter, concerning the directional coupler 1J according to the present modification, description of the same configuration as that of the directional coupler 1E according to Modification 5 will be omitted, and description will be focused on a different configuration.

The loaded circuit 51 is a circuit which is disposed between the switch circuit 41 and a ground and is connected to the sub-line 11 to increase an electrical length of a combined circuit of the sub-line 11 and the loaded circuit 51 with respect to an electrical length of the sub-line 11. The loaded circuit 52 is a circuit which is disposed between the switch circuit 41 and a ground and is connected to the sub-line 11 to increase an electrical length of a combined circuit of the sub-line 11 and the loaded circuit 52 with respect to the electrical length of the sub-line 11.

The loaded circuit 53 is a circuit which is disposed between the switch circuit 42 and a ground and is connected to the sub-line 12 to increase an electrical length of a combined circuit of the sub-line 12 and the loaded circuit 53 with respect to an electrical length of the sub-line 12. The loaded circuit 54 is a circuit which is disposed between the switch circuit 42 and a ground and is connected to the sub-line 12 to increase an electrical length of a combined circuit of the sub-line 12 and the loaded circuit 54 with respect to the electrical length of the sub-line 12.

The switch circuit 41 is an example of the first switch circuit, an example of the second switch circuit, and an example of a third switch circuit, and includes terminals 41*a*, 41*b*, 41*c*, 41*d*, 41*e*, 41*f*, 41*g*, and 41*h*. The terminals 41*a* are connected to the other end 112, the terminals 41*b* are connected to the one end 111, the terminal 41*c* is connected to the loaded circuit 52, the terminals 41*d* and 41*f* are connected to the coupling terminal 130, the terminals 41*e* and 41*g* are connected to the termination circuit 14, and the terminal 41*h* is connected to the loaded circuit 51. Further, the terminals 41*a* can be connected to the terminals 41*c*, 41*d*, and 41*e*, and the terminals 41*b* can be connected to the terminals 41*f*, 41*g*, and 41*h*.

The switch circuit 42 is an example of the first switch circuit, an example of the second switch circuit, and an example of the third switch circuit, and includes terminals 42*a*, 42*b*, 42*c*, 42*d*, 42*e*, 42*f*, 42*g*, and 42*h*. The terminals 42*a* are connected to the other end 122, the terminals 42*b* are connected to the one end 121, the terminal 42*c* is connected to the loaded circuit 54, the terminals 42*d* and 42*f* are connected to the coupling terminal 130, the terminals 42*e* and 42*g* are connected to the termination circuit 14, and the terminal 42*h* is connected to the loaded circuit 53. Further, the terminals 42*a* can be connected to the terminals 42*c*, 42*d*, and 42*e*, and the terminals 42*b* can be connected to the terminals 42*f*, 42*g*, and 42*h*.

For example, the terminal 41*a* and the terminal 41*d* are connected to each other, and the terminal 41*b* and the terminal 41*g* are connected to each other, so that the other end 112 of the sub-line 11 is connected to the coupling terminal 130, and the one end 111 of the sub-line 11 is connected to the termination circuit 14. Further, for example, the terminal 41*a* and the terminal 41*e* are connected to each other, and the terminal 41*b* and the terminal 41*f* are connected to each other, so that the one end 111 of the sub-line 11 is connected to the coupling terminal 130, and the other end 112 of the sub-line 11 is connected to the termination circuit 14. That is, the switch circuit 41 switches connection between the one end 111 and the other end 112 of the sub-line 11 and the coupling terminal 130 and the termination circuit 14.

In this state, in the switch circuit 42, for example, the terminal 42*a* and the terminal 42*c* are connected to each other, and the terminal 42*b* and the terminal 42*h* are connected to each other, whereby the other end 122 of the sub-line 12 is connected to the loaded circuit 54, and the one end 121 of the sub-line 12 is connected to the loaded circuit 53. According to this connection state, in a state where the sub-line 11 and the coupling terminal 130 are connected to each other, the sub-line 12 that is not connected to the coupling terminal 130 is coupled to the main line 10, and a combined circuit of the sub-line 12, the loaded circuit 53, and the loaded circuit 54 can be used as a line having a predetermined electrical length. This makes it possible to operate the combined circuit as a band elimination filter whose attenuation pole is a resonant frequency of the combined circuit.

Further, for example, the terminal 42*a* and the terminal 42*d* are connected to each other, and the terminal 42*b* and the terminal 42*g* are connected to each other, whereby the other end 122 of the sub-line 12 is connected to the coupling terminal 130, and the one end 121 of the sub-line 12 is connected to the termination circuit 14. Further, for example, the terminal 42*a* and the terminal 42*e* are connected to each other, and the terminal 42*b* and the terminal 42*f* are connected to each other, so that the one end 121 of the sub-line 12 is connected to the coupling terminal 130, and the other end 122 of the sub-line 12 is connected to the termination circuit 14. That is, the switch circuit 42 switches connection between the one end 121 and the other end 122 of the sub-line 12 and the coupling terminal 130 and the termination circuit 14.

In this state, as in the connection state illustrated in FIG. 12, in the switch circuit 41, for example, the terminal 41*a* and the terminal 41*c* are connected to each other, and the terminal 41*b* and the terminal 41*h* are connected to each other, whereby the other end 112 of the sub-line 11 is connected to the loaded circuit 52, and the one end 111 of the sub-line 11 is connected to the loaded circuit 51. According to this connection state, in a state where the sub-line 12 and the coupling terminal 130 are connected to each other, the sub-line 11 that is not connected to the coupling terminal 130 is coupled to the main line 10, and a combined circuit of the sub-line 11, the loaded circuit 51, and the loaded circuit 52 can be used as a line having a predetermined electrical length. This makes it possible to operate the combined circuit as a band elimination filter whose attenuation pole is a resonant frequency of the combined circuit.

Further, the switch circuits 41 and 42 switch between connection between the sub-line 11 and the coupling terminal 130 and connection between the sub-line 12 and the coupling terminal 130.

Note that the combined circuit may include a wiring, a switch, or the like other than the main line 10, the sub-line 11, and the sub-line 12 as a constituent element.

According to the configuration of the above-described combined circuit, for example, it is possible to attenuate an unwanted wave such as a harmonic wave of a radio frequency signal to be transmitted through the main line 10. Further, since the sub-line that is not selected is applied as the band elimination filter, a band elimination function can be added by hardly changing the circuit scale. Further, since there is no addition of a new circuit element, it is possible to suppress an increase in insertion loss in a fundamental band.

Note that examples of the loaded circuits 51 to 54 include a circuit element having a capacitance component and an inductance component, or a combined circuit thereof, and a ground short circuit, in addition to the transmission line.

12. Circuit Configuration of Directional Coupler 1K

Figure 13A:
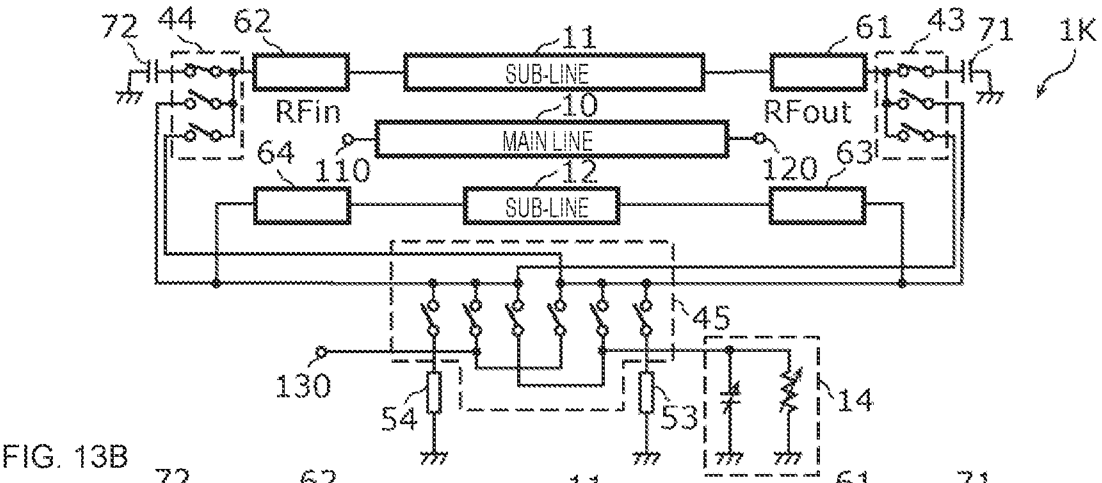
FIG. 13A and FIG. 13B are circuit diagrams illustrating an example of a functional configuration of a directional coupler according to Modification 10.
Figure 13B:
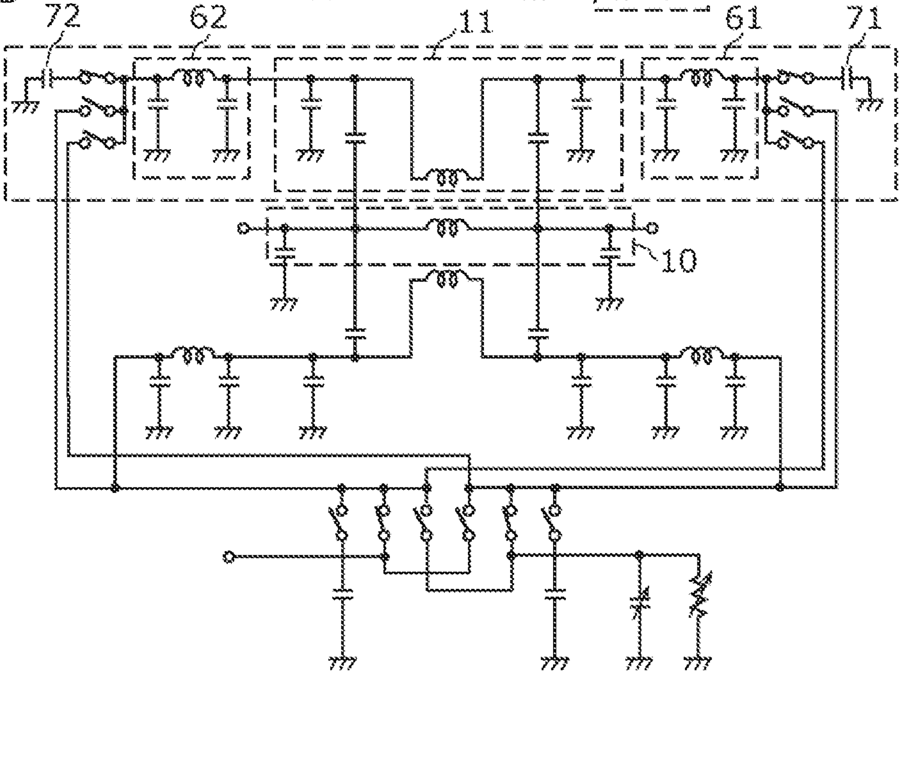

FIG. 13A and FIG. 13B are circuit diagrams illustrating an example of a functional configuration of a directional coupler 1K according to Modification 10. As illustrated in the same figures, the directional coupler 1K includes the main line 10, the sub-lines 11 and 12, the coupling terminal 130, switch circuits 43, 44, and 45, the loaded circuits 53 and 54, loaded lines 61, 62, 63, and 64, capacitors 71 and 72, and the termination circuit 14. The directional coupler 1K according to the present modification differs from the directional coupler 1J according to Modification 9 in configurations of the switch circuits 43, 44, and 45 and the addition of the loaded lines 61 to 64. Hereinafter, concerning the directional coupler 1K according to the present modification, description of the same configuration as that of the directional coupler 1J according to Modification 9 will be omitted, and description will be focused on a different configuration.

The loaded line 61 is a circuit having substantially the same function as the loaded circuit 51 according to Modification 9, disposed between the one end 111 of the sub-line 11 and the switch circuit 43, and configured to increase an electrical length of a combined circuit of the sub-line 11 and the loaded line 61 with respect to the electrical length of the sub-line 11 in a situation in which the sub-line 11 is not connected to the coupling terminal 130. The loaded line 62 is a circuit having the same function as the loaded circuit 52 according to Modification 9, disposed between the other end 112 of the sub-line 11 and the switch circuit 44, and configured to increase an electrical length of a combined circuit of the sub-line 11 and the loaded line 62 with respect to the electrical length of the sub-line 11 in a situation in which the sub-line 11 is not connected to the coupling terminal 130.

Note that, for example, a degree of coupling between the loaded line 61 and the main line 10 is smaller than a degree of coupling between the sub-line 11 and the main line 10, and a degree of coupling between the loaded line 62 and the main line 10 is smaller than the degree of coupling between the sub-line 11 and the main line 10. The degree of coupling between the loaded line 61 and the main line 10 may be equivalent to or larger than the degree of coupling between the sub-line 11 and the main line 10, and the degree of coupling between the loaded line 62 and the main line 10 may be equivalent to or larger than the degree of coupling between the sub-line 11 and the main line 10. An insertion loss of the directional coupler 1K also varies depending on magnitudes of the degrees of coupling between the loaded lines 61 and 62 and the main line 10 with respect to that of the degree of coupling between the sub-line 11 and the main line 10.

The loaded line 63 is a circuit having substantially the same function as the loaded circuit 53 according to Modification 9, disposed between the one end 121 of the sub-line 12 and the switch circuit 45, and configured to increase an electrical length of a combined circuit of the sub-line 12 and the loaded line 63 with respect to the electrical length of the sub-line 12 in a situation in which the sub-line 12 is not connected to the coupling terminal 130. The loaded line 64 is a circuit having the same function as the loaded circuit 54 according to Modification 9, disposed between the other end 122 of the sub-line 12 and the switch circuit 45, and configured to increase an electrical length of a combined circuit of the sub-line 12 and the loaded line 64 with respect to the electrical length of the sub-line 12 in a situation in which the sub-line 12 is not connected to the coupling terminal 130.

Note that, for example, a degree of coupling between the loaded line 63 and the main line 10 is smaller than a degree of coupling between the sub-line 12 and the main line 10, and a degree of coupling between the loaded line 64 and the main line 10 is smaller than the degree of coupling between the sub-line 12 and the main line 10. The degree of coupling between the loaded line 63 and the main line 10 may be equivalent to or larger than the degree of coupling between the sub-line 11 and the main line 10, and the degree of coupling between the loaded line 64 and the main line 10 may be equivalent to or larger than the degree of coupling between the sub-line 11 and the main line 10. An insertion loss of the directional coupler 1K also varies depending on magnitudes of the degrees of coupling between the loaded lines 63 and 64 and the main line 10 with respect to that of the degree of coupling between the sub-line 11 and the main line 10.

The capacitor 71 is a circuit disposed between the switch circuit 43 and a ground, and configured to adjust an electrical length of a combined circuit of the sub-line 11, the loaded line 61, the switch circuit 43, and the capacitor 71 with respect to the electrical length of the combined circuit of the sub-line 11 and the loaded line 61 in a situation in which the sub-line 11 is not connected to the coupling terminal 130. The capacitor 72 is a circuit disposed between the switch circuit 44 and a ground, and configured to adjust an electrical length of a combined circuit of the sub-line 11, the loaded line 62, the switch circuit 44, and the capacitor 72 with respect to the electrical length of the combined circuit of the sub-line 11 and the loaded line 62 in a situation in which the sub-line 11 is not connected to the coupling terminal 130. In other words, each of the capacitors 71 and 72 is a circuit which is connected to the sub-line 11 to make the electric lengths of the respective combined circuits of the sub-line 11, the loaded lines 61 and 62, the switch circuits 43 and 44, and the capacitors 71 and 72 be different from each other with respect to the electrical length of the sub-line 11, and is a type of a loaded circuit.

The loaded circuit 53 is arranged between the switch circuit 45 and a ground. The loaded circuit 53 is a circuit connected to the sub-line 11 and the loaded line 61 to increase an electrical length of a combined circuit of the sub-line 11, the loaded line 61, and the loaded circuit 53 with respect to the electrical length of the combined circuit of the sub-line 11 and the loaded line 61. Further, the loaded circuit 53 is a circuit connected to the sub-line 12 and the loaded line 63 to increase an electrical length of a combined circuit of the sub-line 12, the loaded line 63, and the loaded circuit 53 with respect to the electrical length of the combined circuit of the sub-line 12 and the loaded line 63.

The loaded circuit 54 is arranged between the switch circuit 45 and a ground. The loaded circuit 54 is a circuit connected to the sub-line 11 and the loaded line 62 to increase an electrical length of a combined circuit of the sub-line 11, the loaded line 62, and the loaded circuit 54 with respect to the electrical length of the combined circuit of the sub-line 11 and the loaded line 62. Further, the loaded circuit 54 is a circuit connected to the sub-line 12 and the loaded line 64 to increase an electrical length of a combined circuit of the sub-line 12, the loaded line 64, and the loaded circuit 54 with respect to the electrical length of the combined circuit of the sub-line 12 and the loaded line 64.

For example, in a situation in which the sub-line 12 is connected to the coupling terminal 130 by the switch circuit 45, the switch circuits 43 and 44 form a first combined circuit configured with the ground, the loaded circuit 53, the loaded line 61, the sub-line 11, the loaded line 62, the loaded circuit 54, and the ground. Accordingly, the first combined circuit can be allowed to operate as a band elimination filter whose attenuation pole is a resonant frequency of the first combined circuit.

Further, for example, in a situation in which the sub-line 12 is connected to the coupling terminal 130 by the switch circuit 45, the switch circuits 43 and 44 form a second combined circuit configured with the ground, the capacitor 71, the loaded line 61, the sub-line 11, the loaded line 62, the capacitor 72, and the ground. Accordingly, the second combined circuit can be allowed to operate as a band elimination filter whose attenuation pole is a resonant frequency of the second combined circuit.

Note that in a situation in which the capacitors 71 and 72 are added to the combined circuit configuring the band elimination filter described above, it is possible to shift an attenuation band (or attenuation pole) of the band elimination filter to a lower frequency side. That is, the attenuation band of the band elimination filter can be adjusted to be lower by hardly changing a circuit scale of the directional coupler 1K.

Note that the capacitors 71 and 72 may be formed by the conductor pattern in the mounting substrate, or may be a metal insulator metal (MIM) capacitor or a metal oxide metal (MOM) capacitor formed in the semiconductor IC. Further, the capacitors 71 and 72 may be a capacitor added to a transistor in the semiconductor IC.

In addition, at least one of the capacitors 71 and 72 may not be provided, and at least one of the switch circuits 43 and 44 may be directly connected to a ground. For example, in a situation in which the switch circuit 43 is directly connected to the ground, a third combined circuit configured with the ground, the loaded line 61, the sub-line 11, the loaded line 62, the capacitor 72, and the ground is formed. Since the capacitor 71 is not provided, one end of the third combined circuit serves as a short-circuit end, and thus, a resonant frequency of a third resonance circuit can be about ½ of a resonant frequency in a situation in which both ends of the third resonance circuit are open ends. That is, the short-circuit end can be implemented by using the switch configuration of the switch circuit 43 without providing a new short-circuit portion. Note that it is also possible to further lower the resonant frequency by grounding via an inductor.

13. Circuit Configuration of Directional Coupler 1L

Figure 14:
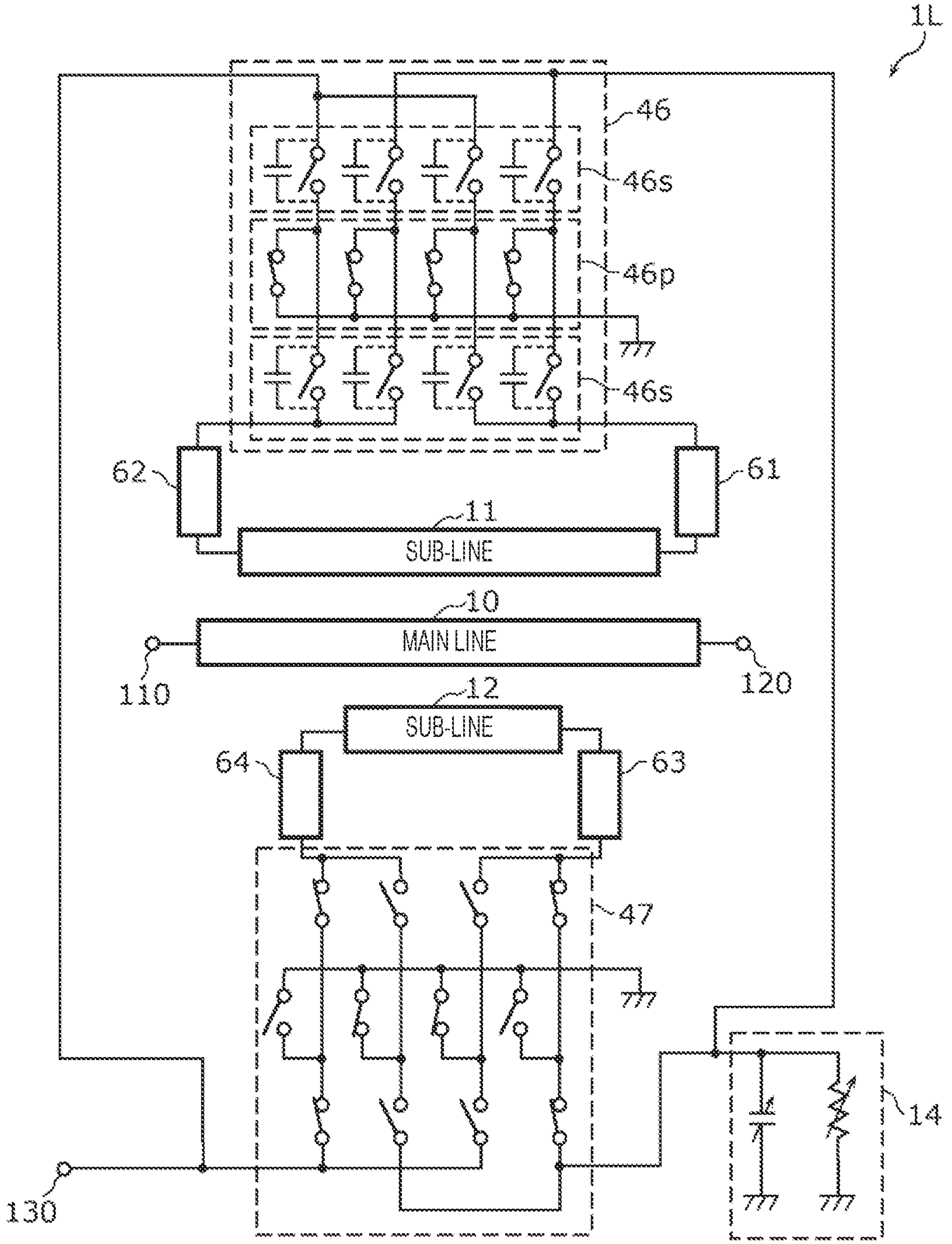
FIG. 14 is a circuit diagram illustrating an example of a functional configuration of a directional coupler according to Modification 11.

FIG. 14 is a circuit diagram illustrating an example of a functional configuration of a directional coupler 1L according to Modification 11. As illustrated in the same figure, the directional coupler 1L includes the main line 10, the sub-lines 11 and 12, the coupling terminal 130, switch circuits 46 and 47, the loaded lines 61, 62, 63, and 64, and the termination circuit 14. The directional coupler 1L according to the present modification differs from the directional coupler 1E according to Modification 5 in that specific circuit configurations of the switch circuits 46 and 47 are disclosed, and in that the loaded lines 61 to 64 are added. Hereinafter, concerning the directional coupler 1L according to the present modification, description of the same configuration as that of the directional coupler 1E according to Modification 5 will be omitted, and description will be focused on a configuration different from that of the directional coupler 1L according to Modification 5.

The loaded line 61 is a circuit having substantially the same function as the loaded line 61 according to Modification 10, disposed between the one end 111 of the sub-line 11 and the switch circuit 46, and configured to increase an electrical length of a combined circuit of the sub-line 11 and the loaded line 61 with respect to the electrical length of the sub-line 11 in a situation in which the sub-line 11 is not connected to the coupling terminal 130. The loaded line 62 is a circuit having substantially the same function as the loaded line 62 according to Modification 10, disposed between the other end 112 of the sub-line 11 and the switch circuit 46, and configured to increase an electrical length of a combined circuit of the sub-line 11 and the loaded line 62 with respect to the electrical length of the sub-line 11 in a situation in which the sub-line 11 is not connected to the coupling terminal 130.

Note that a degree of coupling between the loaded line 61 and the main line 10 is smaller than the degree of coupling between the sub-line 11 and the main line 10, and a degree of coupling between the loaded line 62 and the main line 10 is smaller than the degree of coupling between the sub-line 11 and the main line 10.

The loaded line 63 is a circuit having substantially the same function as the loaded line 63 according to Modification 10, disposed between the one end 121 of the sub-line 12 and the switch circuit 47, and configured to increase an electrical length of a combined circuit of the sub-line 12 and the loaded line 63 with respect to the electrical length of the sub-line 12 in a situation in which the sub-line 12 is not connected to the coupling terminal 130. The loaded line 64 is a circuit having substantially the same function as the loaded line 64 according to Modification 10, disposed between the other end 122 of the sub-line 12 and the switch circuit 47, and configured to increase an electrical length of a combined circuit of the sub-line 12 and the loaded line 64 with respect to the electrical length of the sub-line 12 in a situation in which the sub-line 12 is not connected to the coupling terminal 130.

Note that a degree of coupling between the loaded line 63 and the main line 10 is smaller than the degree of coupling between the sub-line 12 and the main line 10, and a degree of coupling between the loaded line 64 and the main line 10 is smaller than the degree of coupling between the sub-line 12 and the main line 10.

The switch circuit 46 is an example of the first switch circuit and an example of the second switch circuit, and is configured with four switches, similarly to the switch circuit 26 according to Modification 5. The switch circuit 46 is illustrated so as to have specific circuit configurations of the four switches described above, and each of the four switches has a circuit configuration similar to that of the switch 200 illustrated in FIG. 6, and configures a substantially T-shaped switch of a series switch 46*s*/a shunt switch 46*p*/a series switch 46*s*.

The switch circuit 47 is an example of the first switch circuit and an example of the second switch circuit, and is configured with four switches, similarly to the switch circuit 25 according to Modification 5. The switch circuit 47 is illustrated so as to have specific circuit configurations of the four switches, and each of the four switches has a circuit configuration similar to that of the switch 200 illustrated in FIG. 6 and configures a substantially T-shaped switch of a series switch/a shunt switch/a series switch.

For example, as illustrated in FIG. 14, it is assumed that the sub-line 12 and the coupling terminal 130 are connected to each other by the switch circuit 47. In this case, in the sub-line 11 that is not connected to the sub-line 12, all of the series switches 46*s* are turned into a non-conductive state, and all of the shunt switches 46*p* are turned into a conductive state. At this time, a fourth combined circuit of a ground, the shunt switch 46*p* (in the conductive state), the series switch 46*s* (in the non-conductive state), the loaded line 61, the sub-line 11, the loaded line 62, the series switch 46*s* (in the non-conductive state), the shunt switch 46*p* (in the conductive state), and a ground is formed. The fourth combined circuit is loaded with off-capacitances of the series switches 46*s*. The off-capacitances of the series switches 46*s* make it possible to obtain a harmonic wave frequency which is a frequency lower than a resonant frequency of the sub-line 11 and which is twice to three times or more higher than a frequency of a signal to be detected in the sub-line 12 as a resonant frequency of the fourth combined circuit. Thereby, it is possible to attenuate an unwanted signal such as a harmonic wave to be transmitted through the main line 10.

Note that, in the switch circuit 46, some among the four shunt switches 46*p* may be turned into the non-conductive state. Thereby, it is possible to perform adjustment in which an off-capacitance value of the series switch 46*s* is reduced to increase a resonant frequency.

Figure 15B:
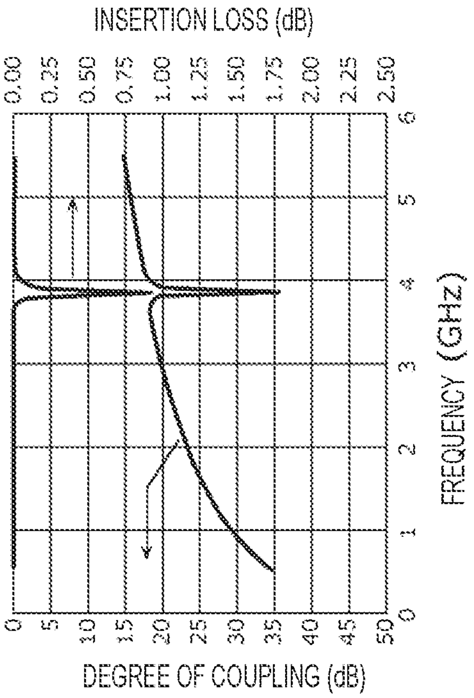
FIG. 15A and FIG. 15B are graphs illustrating degrees of coupling and insertion losses in the directional coupler according to Modification 11, in a case where an off-capacitance of a series switch is not loaded, and in a case where the off-capacitance is loaded.
Figure 15A:
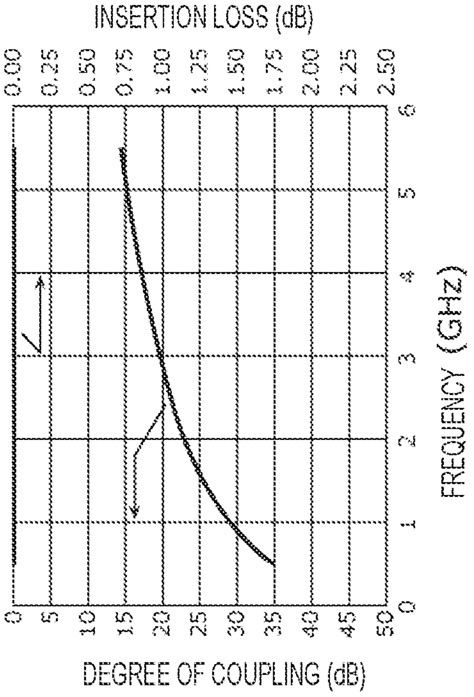

FIG. 15A and FIG. 15B are graphs illustrating degrees of coupling and insertion losses of the main line 10 in the directional coupler 1L according to Modification 11, in a case where an off-capacitance of the series switch 46*s* is not loaded (FIG. 15A) and in a case where the off-capacitance is loaded (FIG. 15B). In FIG. 15A, characteristics of attenuating an unwanted signal such as a harmonic wave to be transmitted through the main line 10 cannot be seen, whereas in FIG. 15B, characteristics of attenuating an unwanted wave in the 3.9 GHz band can be seen.

Note that the switch circuits 46 and 47 are configured with the series/shunt/series substantially T-shaped switches, but may be configured with series/shunt or shunt/series substantially L-shaped switches.

As an order of the switches, in a situation in which the series switch is disposed on a side of the sub-line and the shunt switch is disposed on a side of the coupling terminal 130 or a side of the termination circuit 14, an effect of adjusting and decreasing a frequency on which an unwanted wave is to be attenuated can be obtained. On the other hand, even in a case where the shunt switch is arranged on the side of the sub-line and the series switch is arranged on the side of the coupling terminal 130 or on the side of the termination circuit 14 as the order of the switches, by turning on the shunt switch, a combined circuit of the loaded line 61, the sub-line 11, and the loaded line 62 serves as a part of a ½ wave length resonator whose both ends are short-circuited and can attenuate the unwanted wave. Since an effect of a loaded capacitance does not work due to the short circuit of both end portions, an effect of adjusting and raising a frequency can be obtained. However, in this case, since a coupling state also changes, an insertion loss in the pass band and an attenuation in the attenuation band are likely to largely change.

14. Circuit Configuration of Directional Coupler According to Modification 12

Figure 16:
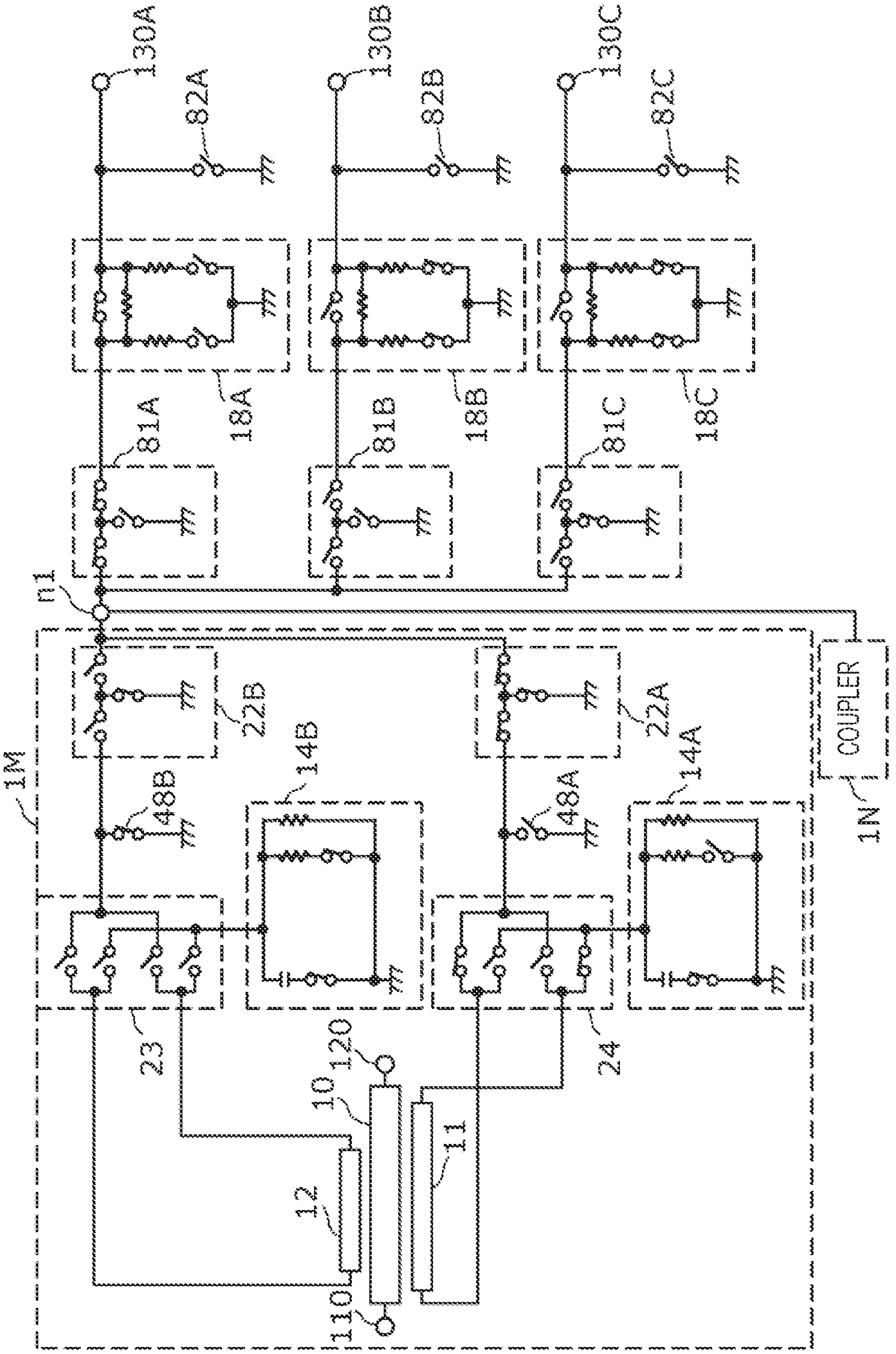
FIG. 16 is a circuit diagram illustrating an example of a functional configuration of a directional coupler according to Modification 12.

FIG. 16 is a circuit diagram illustrating an example of a functional configuration of a directional coupler according to Modification 12 of the embodiment. As illustrated in the same figure, the directional coupler according to the present modification includes couplers 1M and 1N, switches 81A, 81B, 81C, 82A, 82B, and 82C, variable attenuation circuits 18A, 18B, and 18C, and coupling terminals 130A, 130B, and 130C.

The coupler 1M includes the main line 10, the sub-lines 11 and 12, the switch circuits 23 and 24, variable termination circuits 14A and 14B, and switches 22A, 22B, 48A, and 48B.

The sub-line 11 is an example of a first sub-line, and both ends thereof are connected to the switch circuit 24 that switches the directivity. The sub-line 12 is an example of a second sub-line, and both ends thereof are connected to the switch circuit 23 that switches the directivity.

The variable termination circuit 14A is connected to the switch circuit 24, and the variable termination circuit 14B is connected to the switch circuit 23.

The switch 22A is configured with a series/shunt/series substantially T-shaped switch connected between the switch circuit 24 and a collection node n1. The switch 48A is connected between a ground and a connection node between the switch circuit 24 and the switch 22A.

The switch 22B is configured with a series/shunt/series substantially T-shaped switch connected between the switch circuit 23 and the collection node n1. The switch 48B is connected between a ground and a connection node between the switch circuit 23 and the switch 22B.

The switches 22A and 22B configure switches for selecting the sub-line. Further, the switches 48A and 48B are shunt switches for improving isolation.

The coupler 1M and the coupler 1N are connected to the collection node n1. Note that the coupler 1N has a circuit configuration similar to that of the coupler 1M.

Each of the switches 81A, 81B, and 81C is configured with a series/shunt/series substantially T-shaped switch that switches connection between couplers 1M and 1N and the corresponding coupling terminals 130A, 130B, and 130C.

Each of the variable attenuation circuits 18A, 18B, and 18C is configured with resistance elements and switches. The variable attenuation circuit 18A is connected between the switch 81A and the coupling terminal 130A, the variable attenuation circuit 18B is connected between the switch 81B and the coupling terminal 130B, and the variable attenuation circuit 18C is connected between the switch 81C and the coupling terminal 130C.

The switch 82A is connected between a connection node between the coupling terminal 130A and the variable attenuation circuit 18A and a ground, the switch 82B is connected between a connection node between the coupling terminal 130B and the variable attenuation circuit 18B and a ground, and the switch 82C is connected between a connection node between the coupling terminal 130C and the variable attenuation circuit 18C and a ground. Note that the switches 82A, 82B, and 82C are shunt switches that are always in a non-conductive state.

According to the above configuration, switching of the sub-lines 11 and 12 can be performed, and thus a degree of coupling can be controlled within a desired range and a wide frequency range. Further, the single main line 10 can be shared by signals in a wide frequency range, and thus, for example, the present modification can be used in such a manner that a signal of a first communication system or a signal of a second communication system passes through the main line 10 as necessary. Further, the plurality of coupling terminals 130A, 130B, and 130C can be switched by the switches 81A, 81B, and 81C, and therefore, for example, it is possible to supply a detection signal through the desired coupling terminal to a transmitter and receiver (transceiver) of the first communication system or a transmitter and receiver of the second communication system. Also, the signal of the first communication system and the signal of the second communication system may be, for example, a cellular phone (mobile phone) signal in each frequency band by using the modulation and demodulation schemes of the second generation mobile communications system (2G), the third generation mobile communications system (3G), the fourth generation mobile communications system (4G), and the fifth generation mobile communications system (5G), or may be a wireless LAN signal in each frequency band.

Further, when excessive voltages are applied to the coupling terminals 130A, 130B, and 130C, the switches 82A, 82B, and 82C can prevent a main circuit including the directional coupler from being electrostatically broken down by causing the voltages to drop because voltages of transistors that are in an open state drop and unnecessary charges flow into the ground.

Further, since the switches 48A and 48B are respectively provided between the switch circuits 23 and 24 and connection nodes between the switches 22A and 22B and the ground, it is possible to further improve isolation characteristics of the directional couplers 1M and 1N.

15. Effects, etc.

As described above, the directional coupler 1 according to the present embodiment includes the main line 10, the sub-line 11 to be electromagnetically coupled to the main line 10, the sub-line 12 to be electromagnetically coupled to the main line 10, and the coupling terminal 130 configured to output a detection signal corresponding to a radio frequency signal that is transmitted through the main line 10, and the sub-line 11 and the sub-line 12 are different from each other in length, and connection between the sub-line 11 and the coupling terminal 130 and connection between the sub-line 12 and the coupling terminal 130 are switched.

This makes it easier to achieve an appropriate degree of coupling over a frequency band to be operated, and thus it is possible to suppress an increase in insertion loss.

Further, the directional coupler 1 may further include the switch circuit 13 configured to switch between connection between the sub-line 11 and the coupling terminal 130 and connection between the sub-line 12 and the coupling terminal 130.

This makes it possible to disconnect the sub-line that is not used from the coupling terminal 130, and therefore, it is possible to further suppress an increase in insertion loss.

The directional coupler 1 may further include the termination circuit 14 configured to terminate at least one of the sub-lines 11 and 12, and the switch circuit 13 configured to switch between (1) connection between one end of at least one sub-line of the sub-line 11 and the sub-line 12 and the coupling terminal 130, and connection between the other end of the at least one sub-line and the termination circuit 14, and (2) connection between the one end of the at least one sub-line and the termination circuit 14 and connection between the other end of the at least one sub-line and the coupling terminal 130.

Accordingly, bidirectional detection can be performed in the sub-lines.

Moreover, the first switch circuit for selecting the sub-line may include a plurality of switch elements, and the second switch circuit for switching directionality may include the plurality of switch elements included in the first switch circuit.

That is, the plurality of switch elements are used in both the first switch circuit and the second switch circuit. In the directional coupler 1 according to the embodiment, the switch circuit 13 serves as both the first switch circuit and the second switch circuit. This makes it possible to reduce a size of the first switch circuit and the second switch circuit.

In addition, in the directional couplers 1B and 1D, the first switch circuit and the second switch circuit may be individually provided in at least one of the sub-lines 11 and 12.

Thus, the sub-line that is not selected can be disconnected in two stages that are the first switch circuit and the second switch circuit, and the isolation characteristics can be further improved.

In addition, in the directional coupler 1F, the termination circuit may be individually provided for each of the sub-lines 11 and 12.

This makes it possible to simplify adjustment of the termination circuit. Further, since the termination circuit is divided and arranged, and a heat source is dispersed, deterioration of characteristics due to heat is less likely to occur.

In addition, the directional coupler 1J includes the loaded circuits 51 and 52, and the switch circuit 41 configured not to connect the one end of the sub-line 11 to the loaded circuits 51 and 52 in a situation in which the sub-line 11 is connected to the coupling terminal 130 and configured to connect the one end of the sub-line 11 to the loaded circuits 51 and 52 in a situation in which the sub-line 11 is not connected to the coupling terminal 130, and an electrical length of the sub-line 11 and an electrical length of a combined circuit of the sub-line 11 and the loaded circuits 51 and 52 may be different from each other.

This makes it possible to cause the sub-line 11 that is not selected to function as a band elimination filter, and to suppress an influence of an unwanted signal such as a harmonic wave.

Further, the directional coupler 1K may further include the capacitor 71 and the capacitor 72 which are respectively disposed in series between the switch circuits 43 and 44 and the ground.

Accordingly, a resonant frequency can be set to be lower, and thus an unwanted wave can be suppressed in a wider band.

Further, the directional coupler 1L further includes loaded lines 61 and 62 whose degrees of coupling to the main line 10 are smaller than a degree of coupling of the main line 10 and the sub-line 11, one end (first end) of the loaded line 61 and one end (first end) of the loaded line 62 are connected to one end of the sub-line 11, the switch circuit 46 includes the series switches 46*s* provided between the loaded lines 61 and 62 and the coupling terminal 130, and the shunt switches 46*p* provided between the series switches 46*s* and the ground, the other end (second end) of the loaded line 61 and the other end (second end) of the loaded line 62 are connected to the series switches 46*s*, and in a situation in which the sub-line 11 is connected to the coupling terminal 130, the series switches 46*s* may be in a conductive state and the shunt switches 46*p* may be in a non-conductive state, and in a situation in which the sub-line 11 is not connected to the coupling terminal 130, the series switches 46*s* may be in a non-conductive state, and the shunt switches 46*p* may be in a conductive state.

Accordingly, in a situation in which the sub-line 11 is not connected to the coupling terminal 130, the series switches 46*s* act as off-capacitances, and the sub-line 11 that is not used can function as a band elimination filter, together with the loaded lines 61 and 62 and the series switches 46*s*, thereby suppressing an influence of an unwanted signal such as a harmonic wave. Further, since a resonant frequency can be set to be lower due to the off-capacitances of the series switches 46*s*, it is possible to easily suppress the unwanted wave.

Other Embodiments, etc.

Although the directional coupler according to the present embodiment has been described above with reference to the embodiment and the modifications, the directional coupler according to the present disclosure is not limited to the above-described embodiment and modifications. Other embodiments implemented by combining arbitrary constituent elements in the above-described embodiment and modifications, modifications obtained by performing various variations which a person skilled in the art would conceive within the scope of the present disclosure without departing from the spirit of the present disclosure on the above-described embodiment and modifications, and various devices incorporating the above-described directional couplers are also included in the present disclosure.

For example, in the directional couplers according to the embodiment and the modifications thereof, another circuit element, a wiring, and the like may be inserted between the respective circuit elements disclosed in the drawings and the paths for connecting the circuit elements.

INDUSTRIAL APPLICABILITY

The present disclosure can be widely used as a directional coupler.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A directional coupler comprising:
- a main line;
- a first sub-line configured to electromagnetically couple to the main line;
- a second sub-line configured to electromagnetically couple to the main line;
- a coupling terminal configured to output a detection signal corresponding to a radio frequency signal transmitted through the main line;
- a first switch circuit configured to selectively switch the connection of the coupling terminal between the first sub-line and the second sub-line;
- a termination circuit configured to terminate the first sub-line or the second sub-line;
- a second switch circuit configured to selectively switch between a first connection state and a second connection state;
- a mounting substrate; and
- a semiconductor integrated circuit (IC) included the first switch circuit and the second switch circuit and mounted on the mounting substrate, wherein:
- the first sub-line and the second sub-line have different lengths,
- in the first connection state, a first end of the first sub-line or the second sub line is connected to the coupling terminal, and a second end of the first sub-line or the second sub-line is connected to the termination circuit,
- in the second state, the first end of the first sub-line or the second sub-line is connected to the termination circuit, and the second end of the first sub-line or the second sub-line is connected to the coupling terminal,
- the first switch circuit comprises a plurality of switch elements, and
- the second switch circuit comprises the plurality of switch elements.

2. The directional coupler according to claim 1, wherein the first switch circuit and the second switch circuit are individually provided in the first sub-line or the second sub-line.

3. The directional coupler according to claim 1, wherein the termination circuit is individually provided for each of the first sub-line and the second sub-line.

4. The directional coupler according to claim 1, further comprising:
- a loaded circuit; and
- a third switch circuit configured to not connect the first end of the first sub-line to the loaded circuit when the first sub-line is connected to the coupling terminal, and is configured to connect the first end of the first sub-line to the loaded circuit when the first sub-line is not connected to the coupling terminal,
- wherein an electrical length of the first sub-line is different than an electrical length of the first-sub line and the loaded circuit together.

5. The directional coupler according to claim 4, wherein the loaded circuit comprises a capacitor connected in series between the third switch circuit and ground.

6. The directional coupler according to claim 1, further comprising:
- a loaded line having a first end connected to the first end of the first sub-line, wherein:
- the first switch circuit comprises:
  - a first series switch between the loaded line and the coupling terminal, and
  - a first shunt switch between the first series switch and ground,
- a second end of the loaded line is connected to the first series switch,
- when the first sub-line is connected to the coupling terminal, the first series switch is in a conductive state and the first shunt switch is in a non-conductive state, and
- when the first sub-line is not connected to the coupling terminal, the first series switch is in a non-conductive state, and the first shunt switch is in a conductive state.

7. The directional coupler according to claim 1, further comprising:
- a loaded line having a degree of coupling to the main line that is less than a degree of coupling between the first sub-line and the main line, wherein:
- a first end of the loaded line is connected to the first end or the second end of the first sub-line,
- the second switch circuit comprises:
  - a second series switch between the loaded line and the coupling terminal, and
  - a second shunt switch between the second series switch and ground,
- a second end of the loaded line is connected to the second series switch,
- when the first sub-line is connected to the coupling terminal, the second series switch is in a conductive state and the second shunt switch is in a non-conductive state, and
- when the first sub-line is not connected to the coupling terminal, the second series switch is in a non-conductive state, and the second shunt switch is in a conductive state.

* * * * *